(12) United States Patent
Sheffer et al.

(10) Patent No.: US 9,922,458 B2
(45) Date of Patent: Mar. 20, 2018

(54) METHODS AND SYSTEMS FOR GENERATING POLYCUBE SEGMENTATIONS FROM INPUT MESHES OF OBJECTS

(71) Applicant: The University of British Columbia, Vancouver (CA)

(72) Inventors: Alla Sheffer, Vancouver (CA); Nicholas Vining, Vancouver (CA); James Gregson, Vancouver (CA); Marco Livesu, Cagliari (IT)

(73) Assignee: The University of British Columbia, Vancouver, British Columbia (CA)

( * ) Notice: Subject to any disclaimer, the term of this patent is extended or adjusted under 35 U.S.C. 154(b) by 0 days.

(21) Appl. No.: 15/024,848

(22) PCT Filed: Nov. 3, 2014

(86) PCT No.: PCT/CA2014/051055
§ 371 (c)(1),
(2) Date: Mar. 24, 2016

(87) PCT Pub. No.: WO2015/061914
PCT Pub. Date: May 7, 2015

(65) Prior Publication Data
US 2016/0240001 A1    Aug. 18, 2016

Related U.S. Application Data

(60) Provisional application No. 61/899,765, filed on Nov. 4, 2013.

(51) Int. Cl.
*G06T 15/30*    (2011.01)
*G06T 17/20*    (2006.01)
(Continued)

(52) U.S. Cl.
CPC .............. *G06T 17/20* (2013.01); *G06T 19/20* (2013.01); *G06T 11/40* (2013.01); *G06T 15/005* (2013.01);
(Continued)

(58) Field of Classification Search
CPC ....... G06T 17/20; G06T 17/205; G06T 15/04; G06T 15/005; G06T 11/40
See application file for complete search history.

(56) References Cited

U.S. PATENT DOCUMENTS 4,822,090 A    4/1989 Kim
4,833,310 A    5/1989 Shimamura et al.
(Continued)

FOREIGN PATENT DOCUMENTS

EP    0232115 A2    8/1987
EP    0704811 A2    4/1996
(Continued)

OTHER PUBLICATIONS

Gregson et al., "All-Hex Mesh Generation via Volumetric PolyCube Deformation", Eurographics Symposium on Geometry Processing 2011, Computer Graphics Forum, Special Issue of Symposium on Geometry Processing 2011, vol. 30, Issue 5, pp. 1407-1416, Aug. 2011, available online: http://www.cs.ubc.ca/nest/imager/tr/2011/HexMeshingPolycubeDeformation/HexMeshing_files/HexMeshSGP2011.pdf.
(Continued)

*Primary Examiner* — Abderrahim Merouan
(74) *Attorney, Agent, or Firm* — Todd A. Rattray; Oyen Wiggs Green & Mutala LLP

(57) ABSTRACT

A method for generating a polycube segmentation of an input object comprises: providing an input mesh of the object comprising a plurality of surface faces; generating an initial polycube labeling for the faces by assigning, to each
(Continued)

face, a label which is one of six directions (±X,±Y,±Z) aligned with a set of Cartesian axes, the initial polycube labeling defining a plurality of charts, and generating the initial polycube labeling comprising effecting a tradeoff between competing objectives of: making the initial polycube labeling relatively compact; and making the initial polycube labeling relatively faithful to the input object. The method further comprises generating an updated polycube segmentation by changing the label assigned to each of one or more surface faces and thereby modifying one or more of the charts to provide the charts with monotonic boundaries.

57 Claims, 11 Drawing Sheets

(51) Int. Cl.
    *G06T 19/20*    (2011.01)
    *G06T 15/04*    (2011.01)
    *G06T 15/00*    (2011.01)
    *G06T 11/40*    (2006.01)

(52) U.S. Cl.
    CPC ............ *G06T 15/04* (2013.01); *G06T 17/205* (2013.01); *G06T 2219/2021* (2013.01)

(56) References Cited

U.S. PATENT DOCUMENTS

| | | | |
|---|---|---|---|
| 5,729,670 | A | 3/1998 | Strumolo et al. |
| 5,731,817 | A | 3/1998 | Hahs et al. |
| 5,768,156 | A | 6/1998 | Tautges et al. |
| 6,099,058 | A | 8/2000 | Asai et al. |
| 6,124,857 | A | 9/2000 | Itoh et al. |
| 6,259,453 | B1 | 7/2001 | Itoh et al. |
| 6,446,033 | B1 | 9/2002 | Tatsumi et al. |
| 6,573,892 | B1 | 6/2003 | Yang et al. |
| 6,578,189 | B2 | 6/2003 | Hariya et al. |
| 6,600,487 | B1 | 7/2003 | Henn et al. |
| 6,625,938 | B1 | 9/2003 | Shimada et al. |
| 6,804,635 | B1 | 10/2004 | Dhondt et al. |
| 6,904,395 | B1 | 6/2005 | Dejack et al. |
| 6,999,908 | B2 | 2/2006 | Yang et al. |
| 7,098,912 | B1 | 8/2006 | Borden et al. |
| 7,166,381 | B2 | 1/2007 | Choi et al. |
| 7,181,377 | B1 | 2/2007 | Borden et al. |
| 7,671,858 | B1 | 3/2010 | Staten et al. |
| 7,711,532 | B2 | 5/2010 | Dulac et al. |
| 7,930,154 | B2 | 4/2011 | Brusoe |
| 8,126,234 | B1 | 2/2012 | Edwards et al. |
| 8,150,663 | B2 | 4/2012 | Mallet et al. |
| 8,194,068 | B1 | 6/2012 | Staten et al. |
| 8,200,464 | B2 | 6/2012 | Slavik |
| 2002/0120430 | A1 | 8/2002 | Yang et al. |
| 2002/0144231 | A1 | 10/2002 | Hariya et al. |
| 2003/0056733 | A1 | 3/2003 | Niki |
| 2004/0210429 | A1 | 10/2004 | Yu et al. |
| 2006/0139358 | A1 | 6/2006 | Cho et al. |
| 2006/0265169 | A1 | 11/2006 | Breister et al. |
| 2008/0021684 | A1 | 1/2008 | Dulac et al. |
| 2008/0100619 | A1 | 5/2008 | Chien et al. |
| 2008/0189068 | A1 | 8/2008 | Brusoe |
| 2008/0221839 | A1 | 9/2008 | Pasino |
| 2008/0221845 | A1 | 9/2008 | Yu et al. |
| 2008/0303817 | A1 | 12/2008 | Kataoka et al. |
| 2009/0015586 | A1* | 1/2009 | Im ............... G06F 17/5018 345/423 |
| 2009/0112527 | A1 | 4/2009 | Mora et al. |
| 2009/0219287 | A1* | 9/2009 | Wang ............. G06T 15/50 345/426 |
| 2010/0256957 | A1 | 10/2010 | Slavik |
| 2010/0288204 | A1 | 11/2010 | Costello et al. |
| 2010/0290679 | A1 | 11/2010 | Gasser et al. |

FOREIGN PATENT DOCUMENTS

| | | |
|---|---|---|
| EP | 0914909 A2 | 5/1999 |
| EP | 0980049 A2 | 2/2000 |
| EP | 1077431 A1 | 2/2001 |
| EP | 1098208 B1 | 9/2004 |
| EP | 1385103 B1 | 9/2006 |
| EP | 1978487 A2 | 10/2008 |
| EP | 1751585 B1 | 11/2009 |
| EP | 2237175 A1 | 10/2010 |
| EP | 2206086 B1 | 5/2011 |
| JP | 2012198847 | 10/2012 |
| WO | 2002003173 A2 | 1/2002 |
| WO | 2002101659 A2 | 12/2002 |
| WO | 2004072741 A2 | 8/2004 |
| WO | 2005119304 A1 | 12/2005 |
| WO | 2006127632 A2 | 11/2006 |
| WO | 2008094520 A2 | 8/2008 |
| WO | 2009014398 A2 | 1/2009 |
| WO | 2009049681 A1 | 4/2009 |
| WO | 2009050304 A1 | 4/2009 |
| WO | 2009053451 A1 | 4/2009 |
| WO | 2012065619 A1 | 5/2012 |

OTHER PUBLICATIONS

Han et al., "Hexahedral Shell Mesh Construction via Volumetric Polycube Map", Proceedings of the 14th ACM Symposium on Solid and Physical Modeling, SPM'10, pp. 127-136, Sep. 1-3, 2010, available online: http://dl.acm.org/citation.cfm?id=1839796.

He et al., "A Divide-And-Conquer Approach for Automatic Polycube Map Construction", School of Computer Engineering, Nanyang Technology University, Singapore, Computer Science Department, Stony Brook University, NY, USA, Feb. 25, 2009, 14 pages.

Livesu et al., PolyCut: Monotone Graph-Cuts for PolyCube Base-Complex Construction, Published in Journal ACM Transactions on Graphics (TOG), Proceedings of ACM SIGGRAPH Asia 2013, vol. 32, Issue 6, Nov. 2013, available online: http://dl.acm.org/citation.cfm?id=2508388&dl=ACM&coll=DL&CFID=634706511&CFTOKEN=71829507.

Tarini, M., et al., "PolyCube-Maps", ACM Transactions on Graphics 23, 3 (Aug.), 853-860. Proc. of ACM SIGGRAPH 2004.

Yao et al., "Adaptive geometry image", 2008, IEEE Transactions on Visualization and Computer Graphics 14, 4, 948-960.

Xia, J., et al, "Direct product volumetric parameterization of handle bodies via harmonic fields", 2010, In Proc. Shape Modeling International, IEEE, 3-12.

Wang, H. et al., "Polycube splines", 2007, In Proc. Symposium Solid and physical modeling, 241-251.

Chang, C., et al., "Texture tiling on 3d models using automatic polycube maps and wang tiles", 2010, J. Inf. Sci. Eng. 26, 1, 291-305.

Alice Project-Team. Graphite. http://alice.loria.fr/software/graphite/ (downloaded Jun. 30, 2016).

Bommes, D., L'Evy, B., Pietroni, N., Puppo, E., Silva, C., Tarini, M., and Zorin, D. 2013. Quad-mesh generation and processing: A survey. Computer Graphics Forum.

Boykov, Y. and Kolmogorov, V. 2001. An experimental comparison of min-cut/max-flow algorithms for energy minimization in vision. IEEE Transactions on Pattern Analysis and Machine Intelligence 26, 359-374.

Wan, S., Yin, Z., Zhang, K., Zhang, H., and Li, X. 2011. A topology-preserving optimization algorithm for polycube mapping. Computers & Graphics 35, 3, 639-649.

Eppstein, D., and Mumford, E. 2010. Steinitz theorems for orthogonal polyhedra. In Proc. Symposium on Computational Geometry, 429-438.

Xu, Y., Chen, R., Gotsman, C., and Liu, L. 2011. Embedding a triangular graph within a given boundary. Computer Aided Geometric Design 28, 6, 349-356.

Gu, X., Gortler, S. J., and Hoppe, H. 2002. Geometry images. ACM Trans. Graph. 21, 3 (July), 355-361.

(56) References Cited

OTHER PUBLICATIONS

Xia, J., Garcia, I., He, Y., Xin, S.-Q., and Patow, G. 2011. Editable polycube map for gpu-based subdivision surfaces. In Proc. Symposium on Interactive 3D Graphics and Games, 151-158.

Wang, H., Jin, M., He, Y., Gu, X., and Qin, H. 2008. User-controllable polycube map for manifold spline construction. In Proc. Symposium on Solid and physical modeling, 397-404.

Hoos, H., and Sttzle, T. 2004. Stochastic Local Search: Foundations & Applications. Morgan Kaufmann Publishers Inc., San Francisco, CA, USA.

Hormann, K., and Floater, M. S. 2006. Mean value coordinates for arbitrary planar polygons. ACM Transactions on Graphics 25, 4 (Oct.), 1424-1441.

Ju, T., Schaefer, S., and Warren, J. 2005. Mean value coordinates for closed triangular meshes. SIGGRAPH, 561-566.

Kolmogorov, V., and Zabih, R. 2004. What energy functions can be minimized via graph cuts. IEEE Transactions on Pattern Analysis and Machine Intelligence 26, 65-81.

L'Evy, B., and Liu, Y. 2010. Lp centroidal voronoi tesselation and its applications. ACM Transactions on Graphics (Proc. SIGGRAPH).

Li, B., and Qin, H. 2012. Component-aware tensor-product trivariate splines of arbitrary topology. Computers & Graphics.

Li, B. Li, X. Wang, K., and Qin, H. 2010. Generalized poly-cube trivariate splines. In Proc. Shape Modeling International, 261-265.

Li, X., Xu, H., Wan, S., Yin, Z., and Yu, W. 2010. Feature-aligned harmonic volumetric mapping using mfs. Computers & Graphics 34, 3, 242-251.

Li, B. Li, X. Wang, K., and Qin, H. 2012. Surface mesh to volumetric spline conversion with generalized polycubes. IEEE Transactions on Visualization and Computer Graphics 99.

Lin, J., Jin, X. Fan, Z., and Wang, C. C. L. 2008. Automatic polycube-maps. In Proc. Advances in geometric modeling and processing, 3-16.

Praun, E., and Hoppe, Fl 2001 Spherical parametrization and remeshing. ACM Trans. Graph. 22, 3 (July), 340-349.

Shamir, A. 2008. A survey on mesh segmentation techniques. Comput. Graph. Forum 27, 1539-1556.

Sheffer, A., Praun, E., and Rose, K. 2006. Mesh parameterization methods and their applications. Foundations and Trends in Computer Graphics and Vision 2, 2, 105-171.

Blacker, T. 2000. Meeting the challenge for automated conformal hexahedral meshing. In Proc. International Meshing Roundtable.

Erickson, J. 2014. Efficiently hex-meshing things with topology. Discrete and Computational Geometry 52, 3, 427-149.

Freitag Diachin, L., Knupp, P., Munson, T., and Shontz, S. 2006. A comparison of two optimization methods for mesh quality improvement. Engineering with Computers 22, 2, 61-74.

Knupp, P.M. 2001. Hexahedral and tetrahedral mesh untangling. Engineering with Computers 17, 3, 261-268.

Knupp, P. M. 2003. A method for hexahedral mesh shape optimization. Intl. Journal for Numerical Methods in Engineering 58, 2, 319-332.

Nieser, M., Reitebuch, U., and Polthier, K. 2011. Cube-Cover—Parameterization of 3D Volumes. Computer Graphics Forum.

Paillé, G.-P., Poulin, P., and L'Evy, B. 2013. Fitting polynomial volumes to surface meshes with Voronoi squared distance minimization. Computer Graphics Forum 32, 5, 103-112.

Ruiz-Gironés, E., Roca, X., Sarrate, J., Montenegro, R., and Escobar, J. 2014. Simultaneous untangling and smoothing of quadrilateral and hexahedral meshes using an object-oriented framework. Advances in Engineering Software.

Zhang, Y., Bajaj, C., and Xu, G. 2009. Surface smoothing and quality improvement of quadrilateral/hexahedral meshes with geometric flow. Communications in Numerical Methods in Engineering 25, 1, 1-18.

Sastry, S. P., and Shontz, S. M. 2009. A comparison of gradient-and hessian-based optimization methods for tetrahedral mesh quality improvement. In Proc. International Meshing Roundtable.

Sastry, S., and Shontz, S. 2014. A parallel log-barrier method for mesh quality improvement and untangling. Engineering with Computers 30, 4, 503-515.

Schüller, C., Kavan, L, Panozzo, D., and Sorkine-Hornung, O. 2013. Locally injective mappings. computer Graphics Forum (Proc. SGP) 32, 5, 125-135.

Sorkine, O., and Alexa, M. 2007. As-rigid-as-possible surface modeling. In Proc. SGP, 109-116.

Sun, L., Zhao, G., and Ma, X. 2012. Quality improvement methods for hexahedral element meshes adaptively generated using grid-based algorithm. Intl. Journal for Numerical Methods in Engineering 89, 6, 726-761.

Vartziotis, D., and Himpel, B. 2014. Efficient and global optimization-based smoothing methods for mixed-volume meshes. In Proc. International Meshing Roundtable. 293-311.

Vartziotis, D., and Papadrakakis, M. 2011 Improved GETMe by adaptive mesh smoothing. Computer Assisted Methods in Engineering and Science, 20, 55-71.

Wilson, T., Sarrate, J., Roca, X., Montenegro, R., and Escobar, J. 2012. Untangling and smoothing of quadrilateral and hexahedral meshes. In Eighth Intl. Conference on Engineering Computational Technology.

Levy B. et al., "Lp Centroidal Voronoi Tesselation and its Applications", ACM Trans. Graph. 29, 4, Article 119 (Jul. 2010).

Labelle et al., "Isosurface Stuffing: Fast Tetrahedral Meshes with Good Dihedral Angles", Siggraph 2007, Conference Proceedings, University of California at Berkeley.

Mitchell, Scott A., "Technical History of Hex Mesh Generation", Sandia National Labs, CUBIT Mesh Generation Project, Sep. 15, 2002.

Marechal L., "Advances in Octree-Based All-Hexahedral Mesh Generation: Handling Sharp Features", In Proc. International Meshing Roundtable, 2009.

Ben-Chen M. et al., "Variational Harmonic Maps for Space Deformation", ACM Transactions on Graphics, vol. 28, No. 3, Article 34, Aug. 2009.

Brewer M., Diachin L. F., Knupp P. M., Leurent T., Melander D.: The mesquite mesh quality improvement toolkit. In Proc. Intl. Meshing Roundtable (2003).

Botsch M., Pauly M., Wicke M., Gross M. H.: Adaptive space deformations based on rigid cells. Computer Graphics Forum 26,3 (2007), 339-347.

Bommes D., Zimmer H., Kobbelt L.: Mixed integer quadrangulation. ACM Trans. Graph. 28, 3 (2009), 1-10.

Cignoni P. et al., "Metro: measuring error on simplified surfaces", Tech. rep., Paris, 1996.

Daniels J. et al., "Semi-regular Quadrilateral-only Remeshing from Simplified Base Domains", In Proc. Symp. on Geom. Proc. (2009), pp. 1427-1435.

Muller-Hannemann M., "Shelling Hexahedral Complexes for Mesh Generation", Journal of Graph Algorithms and Applications, vol. 5, No. 5, (2001), pp. 59-91.

Floater M.S. et al., "Mean value coordinates in 3D", Comput. Aided Geom. Des. 22 (Oct. 2005), 623-631.

Owen S. J., "A Survey of Unstructured Mesh Generation Technology", Department of Civil and Environment Engineering, Camgie Mellon University, (1998).

Zhou K. et al., "Large Mesh Deformation Using the Volumetric Graph Laplacian", .Association for Computing Machinery Inc. (2005), pp. 496-503.

Kälberer F. et al., "QuadCover—Surface Parameterization using Branched Coverings", Computer Graphics Forum 26, 3 (2007), 375-384.

Levy B.: Graphite. http://alice.loria.fr/. Prior to filing dated Jul. 22, 2013.

Pebay P. et al., "New Applications of the Verdict Library for Standardized Mesh Verification, Pre, Post, and End-to-End Processing", Sandia National Laboratories, The University of Iowa, (2007).

Lavin Y. et al., "The Topology of Three-Dimensional Symmetric Tensor Fields", In Late Breaking Hot Topics IEEE Visualization '96 (1996), CS Press, pp. 43-46.

(56) References Cited

OTHER PUBLICATIONS

Schneiders R., "A Grid-based Algorithm for the Generation of Hexahedral Element Meshes", Engineering with Computers 12 (1996), 168-177.

Shepherd J. F., "Topologic and Geometric Constraint Based Hexahedral Mesh Generation", PhD thesis, University of Utah, May 2007.

TetGen, "A Quality Tetrahedral Mesh Generator and Three-Dimensional Delaunay Triangulator" Available online: http://www.tetgen.org. Prior to filing date of Jul. 22, 2013.

Shepherd J. F., "Hexahedral Mesh Generation Constraints", Scientific Computing and Imaging Institute, University of Utah, Feb. 13, 2006.

Staten M. et al., "Unconstrained Paving and Plastering: Progress Update", Sandia Corporation (2006), pp. 469-486.

Sorkine O., "Differential Representations for Mesh Processing", School of Computer Science, Tel Aviv University, vol. 25 (2006), No. 4,789-807.

Suzuki T. et al., "An Interior Surface Generation Method for All-Hexahedral Meshing", In Proc. International Meshing Roundtable (2005), pp. 377-397.

Tournois J. et al., "Interleaving Delaunay Refinement and Optimization for Practical Isotropic Tetrahedron Mesh Generation", ACM Trans. Graph. 28 (2009).

Vyas V. et al., "Tensor-Guided Hex-Dominant Mesh Generation with Targeted All-Hex Regions", In Proc. International Meshing Roundtable (2009), Department of Mechanical Engineering, Carnegie Mellon University.

Wicke M. et al., Dynamic Local Remeshing for Elastoplastic Simulation, ACM Trans. Graph. 29 (Jul. 2010), University of California, Berkeley.

Yu Y. et al., "Mesh Editing with Poisson-Based Gradient Field Manipulation", ACM SIGGRAPH (2004), pp. 1-8.

Shepherd, J. F., and Johnson, C. R. 2008. Hexahedral mesh generation constraints. Engineering with computers 24, 3, 195-213.

Tautges, T. J., Blacker, T., and Mitchell, S. A. 1996. The whisker weaving algorithm: a connectivity-based method for constructing all-hexahedral finite element meshes. Intl. Journal for Numerical Methods in Engineering 39, 19, 3327-3349.

Miyoshi, K., and Blacker, T. 2000. Hexahedral mesh generation using multi-axis cooper algorithm. In Proc. International Meshing Roundtable, 89-97.

Li, Y., Liu, Y., Xu, W., Wang, W., and Guo, B. 2012. All-hex meshing using singularity-restricted field. ACM Trans. Graph. 31, 6.

Huang, J., Jiang, T., Shi, Z., Tong, Y., Bao, H., and Desbrun, M. 2014. L1 based construction of polycube maps from complex shapes. ACM Trans. Graph. 33, 3 (June), 25:1-25:11.

Aigerman, N., and Lipman, Y. 2013. Injective and bounded distortion mappings in 3d. ACM Trans. Graph. 32, 4.

\* cited by examiner

METHODS AND SYSTEMS FOR GENERATING POLYCUBE SEGMENTATIONS FROM INPUT MESHES OF OBJECTS

RELATED APPLICATIONS

This application claims the benefit of the priority of U.S. application No. 61/899,765 filed 4 Nov. 2013, which is hereby incorporated by reference herein.

TECHNICAL FIELD

This invention relates generally to digital (e.g. computer) representations of objects. Particular embodiments provide methods and systems for generating polycube segmentations for input objects. Particular embodiments provide methods and systems for using polycube segmentations to generate polycube representations and/or multi-sweep representations of input objects.

BACKGROUND

Three-dimensional models of input objects may be digitally modeled (e.g. on a computer system and/or other suitable processor(s)) in volumetric representations known as tetrahedral-meshes or "tet-meshes". There are techniques known in the art for obtaining tet-mesh representations of objects. For example, isotropic volumetric tet-meshes can be generated from isotropic surface meshes using known software, such as Tetgen™. Non-isotropic surface meshes can be re-meshed using known software such as Graphite™ and the re-meshed surface meshes may then be used to generate suitable volumetric tet-meshes.

It can be desirable to generate polycubes (orthogonal polyhedral) or polycube representations of input objects. A polycube is a solid formed by joining several cubes face to face. Polycubes may be used as base complexes for parameterizing closed surfaces and volumes. Non-limiting examples of uses for polycube representations include: surface texture mapping (see TARINI, M., HORMANN, K., CIGNONI, P., AND MONTANI, C. 2004. PolyCube-Maps. ACM Transactions on Graphics 23, 3 (August), 853-860. Proc. of ACM SIGGRAPH 2004; and YAO, C., AND LEE, T. 2008. Adaptive geometry image. IEEE Transactions on Visualization and Computer Graphics 14, 4, 948-960); hexahedral meshing (see GREGSON, J., SHEFFER, A., AND ZHANG, E. 2011. All-hex mesh generation via volumetric polycube deformation. Computer Graphics Forum (Proc. SGP) 30, 5; and XIA, J., HE, Y., YIN, X., HAN, S., AND GU, X. 2010. Direct product volumetric parameterization of handle bodies via harmonic fields. In Proc. Shape Modeling International, IEEE, 3-12); trivariate spline fitting (see WANG, H., HE, Y., LI, X., GU, X., AND QIN, H. 2007. Polycube splines. In Proc. Symposium on Solid and physical modeling, 241-251); and volumetric texturing (see CHANG, C.-C., AND LIN, C.-Y. 2010. Texture tiling on 3d models using automatic polycube-maps and wang tiles. J. Inf. Sci. Eng. 26, 1, 291-305).

Polycubes are used in computer graphics applications because they may allow for efficient storage of geometry and/or texture information generally, and may specifically provide relatively regular and/or compact representations of graphical objects. Such representations can confer certain advantages in some computer-implemented graphical systems; for example, in some circumstances, such representations may be conveniently cached, allow for relatively straightforward texture filtering, and provide smooth face boundaries for texturing applications. Polycubes also find application in GPU subdivision and multiresolution representations, and can serve as intermediate primitives for quad meshing or hex meshing operations.

There is a general desire for methods and systems for converting input mesh representations of objects (e.g. tet-meshes) into polycube representations. A difficulty associated with generating polycube representations of input objects involves addressing the tradeoff between parametrization distortion and compactness. Parameterization distortion represents the distortion between the surface geometry of the input object and the surface geometry of the polycube representation. There is a general desire to provide a polycube representation with a low amount of parameterization distortion. Compactness may be indicated by the number of polycube faces and/or the number of singularities (corners of the polycube faces) and/or the length of the boundaries between polycube faces of the polycube representation. There is a general desire to provide a compact polycube representation (i.e. correspondingly low polycube face counts and/or singularity counts and/or correspondingly short chart boundaries). Compact polycube representations permit relatively low element counts for applications such as hex meshing, volume fitting and/or surface fitting.

Because of the difficulty associated with managing the tradeoff between parameterization distortion and polycube face or singularity counts, most techniques for generating and using polycube representations rely on manual and/or semi-manual construction of polycubes. Once generated, these (semi-)manually constructed polycubes may be processed by a computer system. However, it is desirable to have a computational approach for generating polycube representations so that computer systems may generate high-quality polycube constructions programmatically.

A prior art technique for programmatically generating polycube representations proposed by Gregson et al. (GREGSON, J., SHEFFER, A., AND ZHANG, E. 2011. All-hex mesh generation via volumetric polycube deformation. Computer Graphics Forum (Proc. SGP) 30, 5) used the angles between normal vectors of the surface vertices of the input mesh and the polycube axes as an implicit measure of parameterization distortion. This measure of distortion estimates the distortion caused by flattening each chart and rotating the charts so that they form polycube faces having ninety degree dihedral angles with one another.

A polycube segmentation of an input model corresponding to an input object may be used herein to describe an assignment of a polycube axis label ($\pm X, \pm Y, \pm Z$) to each outer surface face (e.g. each triangular surface face in the case of a tet-mesh model) on a surface of the object. Within a polycube segmentation, contiguous groups of surface faces (e.g. surface triangles) that are assigned the same label may be referred to herein as charts. A polycube representation (or, for brevity, a polycube) may be extracted from a polycube segmentation. When a polycube is extracted from a polycube segmentation, the charts of the polycube segmentation become the planar and axis-aligned surface faces of the polycube and the labels of the charts of the polycube segmentation become the directions of the normal vectors of the polycube faces.

When generating polycube representations, an additional source of parameterization distortion comes from the shape and directionality of chart boundaries of the polycube segmentation and the need to map chart boundaries of the polycube segmentation to the axis-aligned straight edges of the polycube. A chart boundary of a polycube segmentation may be defined between a pair of adjacent charts to be a sequence of edges shared by triangles belonging to the two different charts. In a polycube, such a boundary maps to an axially aligned straight boundary between a pair of polycube faces corresponding to the pair of charts. Since the faces of a polycube are oriented to have normal vectors aligned with the Cartesian axes ($\pm X, \pm Y, \pm Z$), it follows that the boundary between a pair of polycube faces having normal vectors along first and second Cartesian axes, should be oriented along the third Cartesian axis. For example, if two adjacent polycube faces have normal vectors oriented in the +X and +Y directions, the boundary between the pair of polycube faces will be oriented along the Z-axis and should have either a +Z direction or a −Z direction.

The Gregson et al. technique, which does not account for the shape and directionality of chart boundaries, tends to generate polycube segmentations having non-monotone boundaries. For a particular polycube segmentation, non-monotone chart boundaries are chart boundaries where the direction of the boundary switches sign with respect to the axis along which it should be oriented. Following with the preceding example where a pair of adjacent polycube faces has normal vectors oriented in the +X and +Y directions, we would expect that those polycube faces correspond to charts in a polycube segmentation where the charts were assigned +X and +Y labels. As discussed above, the boundary between these polycube faces should be oriented along the Z axis (i.e. either +Z or −Z). Accordingly, we would expect that the boundary between the corresponding charts should be oriented either in a +Z direction or a −Z direction. This chart boundary is considered to be non-monotone if its directionality changes from a +Z orientation to a −Z orientation or from a −Z direction to a +Z direction.

The locations where a non-monotone chart boundary changes sign with respect to the axis along which it should be oriented may be referred to as turning points. FIG. 1 is a schematic representation of a number of views of a polycube segmentation 4 of an input object 2 showing the charts of the polycube segmentation (as differently colored regions). The charts of the FIG. 1 segmentation comprise a number of turning points and, consequently, are non-monotone. Mapping a non-monotone chart boundary having a turning point to a corresponding polycube edge (which is straight and axis-aligned) involves introducing extreme distortion.

Accordingly, there is a general desire to generate polycube segmentations that have all-monotone boundaries (i.e. boundaries without turning points). However, computationally generating polycube segmentations with all-monotone boundaries presents significant technical challenges, as the number of possible segmentations (and thus the number of possible boundary definitions) increases exponentially with the number of elements in the tet-mesh. Further, existing approaches can, in some circumstances, provide relatively low gains in compactness for corresponding increases in parametrization distortion (and vice-versa). Accordingly, there is a general desire for computational approaches to polycube segmentation generation which provide improved efficiency and/or improved tradeoffs between parametrization distortion and compactness.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for generating a polycube segmentation of an input object. The method comprises: providing, at a processor, an input mesh representation of the input object comprising a plurality of surface faces representing a surface of the input object; generating, by the processor, an initial polycube labeling for the surface faces, wherein generating the initial polycube labeling comprises assigning, to each surface face, a label which is one of six directions ($\pm X, \pm Y, \pm Z$) aligned with a set of Cartesian axes, the initial polycube labeling defining a plurality of charts, each chart comprising a contiguous patch of one or more surface faces having the same label, and wherein generating the initial polycube labeling comprises effecting, by the processor, a tradeoff between competing objectives of: making the initial polycube labeling relatively compact; and making the initial polycube labeling relatively faithful to a surface geometry of the input object; and generating, by the processor, an updated polycube segmentation, wherein generating the updated polycube segmentation comprises changing the label assigned to each of one or more surface faces and thereby modifying one or more of the charts to provide the charts with monotonic boundaries.

In some embodiments, polycube segmentations may be further processed to generate three-dimensional polycube representations of the input object. In some embodiments, polycube segmentations may be further processed to generate three-dimensional multi-sweep representations of the input object.

Systems according to particular embodiments may comprise a processor configured to perform such methods for generating polycube segmentations, polycube representations and/or multi-sweep representations. Non-transitory computer-readable media may be provided with instructions, which (when executed by a suitably configured processor, cause the processor to generate such polycube segmentations, polycube representations and/or multi-sweep representations.

According to another aspect of the invention, the methods described herein are encoded on computer readable media and which contain instructions executable by a processor to cause the processor to perform one or more of the methods described herein.

According to another aspect of the invention, systems are provided wherein processors are configured to perform one or more of the methods described herein.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
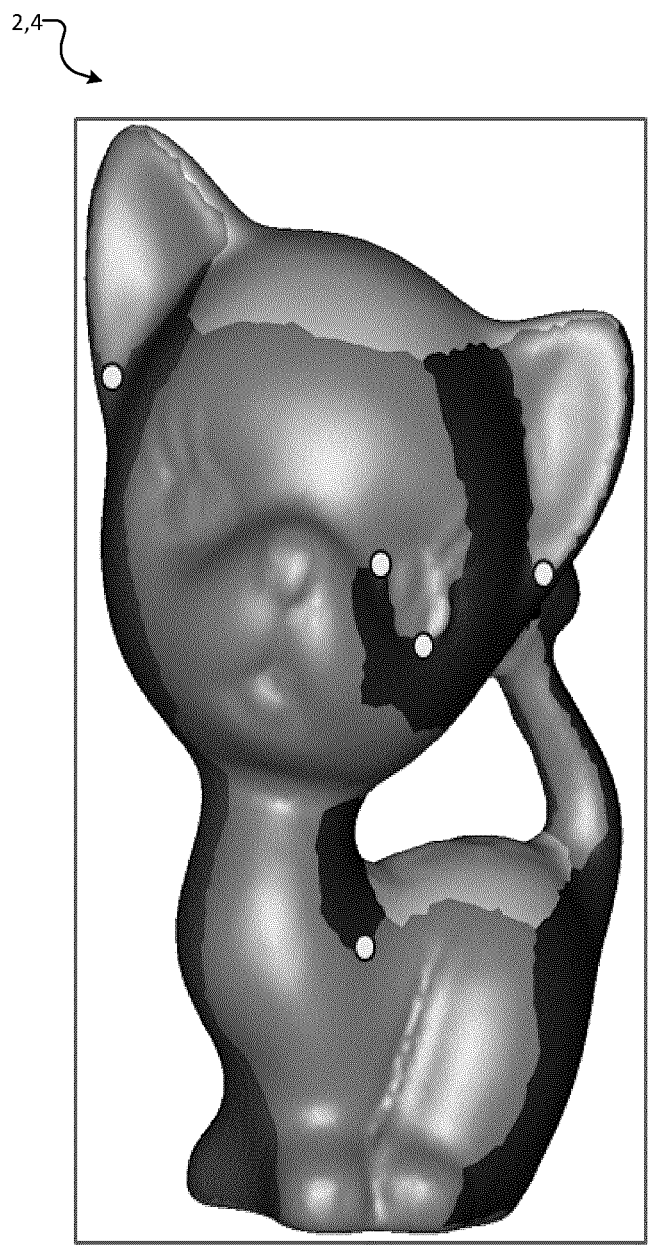
FIG. 1 is an example of a polycube segmentation which includes a number of non-monotone chart boundaries and highlights a number of their respective turning points.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide methods for generating a polycube segmentation of an input object. The methods comprise: providing an input mesh of the object comprising a plurality of surface faces; generating an initial polycube labeling for the faces by assigning, to each face, a label which is one of six directions (±X,±Y,±Z) aligned with a set of Cartesian axes, the initial polycube labeling defining a plurality of charts, and generating the initial polycube labeling comprising effecting a tradeoff between competing objectives of: making the initial polycube labeling relatively compact; and making the initial polycube labeling relatively faithful to the input object. The method further comprises generating an updated polycube segmentation by changing the label assigned to each of one or more surface faces and thereby modifying one or more of the charts to provide the charts with monotonic boundaries.

In some embodiments, polycube segmentations may be further processed to generate three-dimensional polycube representations of the input object. In some embodiments, polycube segmentations may be further processed to generate three-dimensional multi-sweep representations of the input object.

Systems according to particular embodiments may comprise a processor configured to perform such methods for generating polycube segmentations, polycube representations and/or multi-sweep representations. Non-transitory computer-readable media may be provided with instructions, which (when executed by a suitably configured processor, cause the processor to generate such polycube segmentations, polycube representations and/or multi-sweep representations.

Methods described herein are implemented by suitably configured computers and/or suitably configured processors (referred to herein as a "computer system"). Throughout the disclosure where a processor, computer or computer readable medium is referenced such a reference may include one or more processors, computers or computer readable media in communication with each other through one or more networks or communication mediums. The one or more processors and/or computers may comprise any suitable processing device, such as, for example, application specific circuits, programmable logic controllers, field programmable gate arrays, microcontrollers, microprocessors, computers, virtual machines and/or electronic circuits. The one or more computer readable media may comprise any suitable memory devices, such as, for example, random access memory, flash memory, read only memory, hard disc drives, optical drives and optical drive media, or flash drives. Further, where a communication to a device or a direction of a device is referenced it may be communicated over any suitable electronic communication medium and in any suitable format, such as, for example, wired or wireless mediums, compressed or uncompressed formats, encrypted or unencrypted formats.

Figure 2:
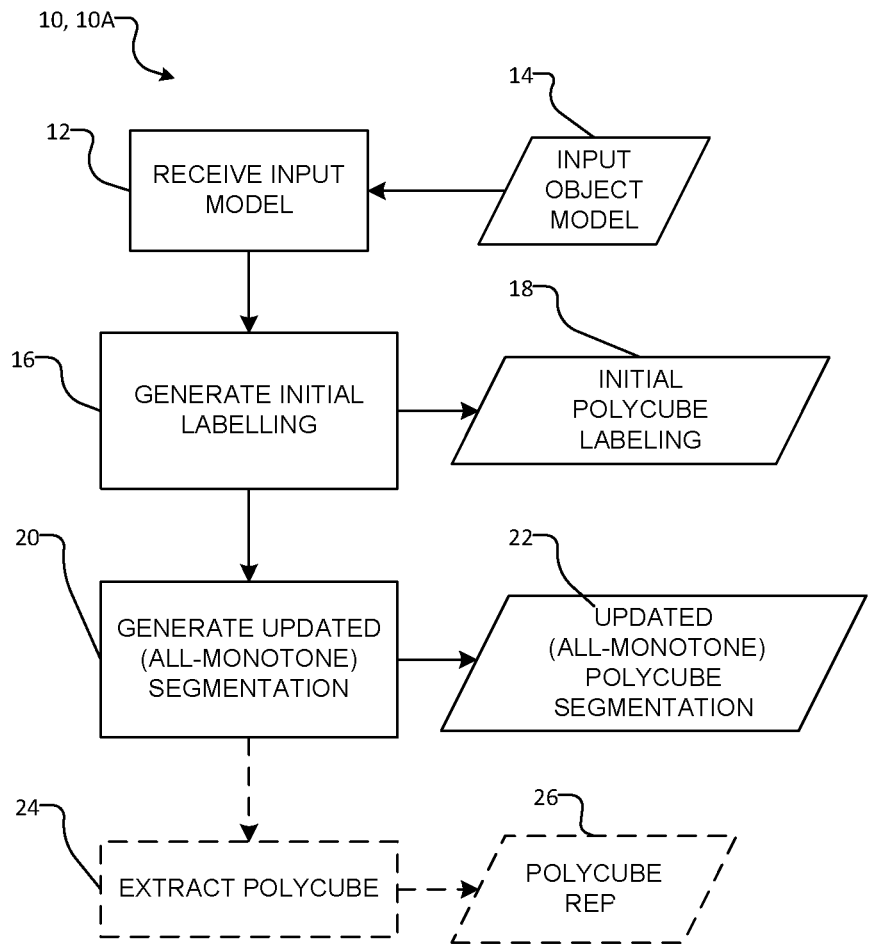
FIG. 2 is a schematic representation of a computer-implemented method for generating an all-monotone polycube segmentation of an input object model according to a particular embodiment of the invention and an optional method for using the polycube segmentation to generate a three-dimensional polycube representation of the input object.

FIG. 2 is a schematic representation of a computer-implemented method 10 for generating an all-monotone polycube segmentation of an input model of an object according to a particular embodiment of the invention. As explained in more detail below, FIG. 2 also illustrates an optional method 10A, which uses the polycube segmentation output from method 10 to generate a three-dimensional polycube representation of the input model and a mapping between the polycube representation and the input model. Methods 10, 10A may be performed by a suitably configured computer system.

The output of a computer system performing the FIG. 2 method 10 is an all-monotone polycube segmentation 22 based on an input model 14 that represents a corresponding input object. As discussed above, a polycube segmentation comprises an assignment of a polycube axis label (±X,±Y, ±Z) to each surface face (e.g. each triangular surface face in the case of a tet-mesh) on a surface of the input model. For brevity, polycube axis labels (±X,±Y,±Z) may be referred to herein as labels. Within a polycube segmentation, contiguous groups of surface faces that are assigned the same label may be referred to herein as charts. A chart boundary of a polycube segmentation may be defined between a pair of adjacent charts to comprise a sequence of edges shared by triangles belonging to the two different charts. As discussed above, because of the labels applied to the adjacent charts that define a chart boundary, the chart boundary of a polycube segmentation has an associated axial orientation. For example, if two adjacent charts have +X and +Y labels, the boundary between the pair of charts will be associated with the Z-axis and should have either a +Z direction or a −Z direction. The all-monotone polycube segmentation 22 generated by method 10 is a polycube segmentation where all of the chart boundaries are monotonic—i.e. none of the chart boundaries have turning points where the direction of the boundary switches sign with respect to the axis along which it is associated.

In some embodiments, the all-monotone polycube segmentation 22 generated by a computer system performing method 10 meets one or more additional criteria for a valid polycube segmentation. These criteria, which may be sufficient (but which are not always necessary) include: (i) all charts of polycube segmentation 22 have at least four neighbors; (ii) no two charts of polycube segmentation 22 with opposing label orientations along the same axis (e.g. a +Z chart and −Z chart share a chart boundary); and (iii) each chart corner (chart vertex) of polycube segmentation 22 has a valence of three—i.e. is a vertex for three charts.

In addition to being all-monotone and satisfying the criteria for a valid polycube segmentation, it is desirable, as discussed above, for any polycube extracted from the polycube segmentation to have relatively low parameterization distortion (e.g. to have a surface geometry that is relatively similar to the surface geometry of the input model) and to be relatively compact (e.g. to have a small number of polycube faces, a relatively small number of polycube corners and/or relatively small lengths of boundaries between polycube faces of the polycube representation). As discussed in more detail below, the particular embodiments provide techniques for generating polycube segmentations, which balance the competing objectives of minimizing parameterization distortion and being relatively compact. In some embodiments, this balance is achieved by performing, by a suitably configured computer system, one or more computational optimizations, which optimize cost function(s) wherein the cost function(s) assign cost based at least in part on a metric associated with parameterization distortion and based at least in part on a metric which assigns cost based at least in part on compactness. In some embodiments, such cost function(s) comprise a fidelity term which assigns cost based at least in part on parameterization distortion and a compactness term which assigns cost based at least in part on compactness. In some embodiments, the compactness term may be based, at least in part, on the number of charts, the number of chart corners and/or the length of chart boundaries. In some embodiments, the fidelity term(s) are based, for each surface face of the input model, at least in part, on an angle between the assigned label and the normal vector of the face. In some embodiments, these cost functions may be locally perturbed in the vicinity of turning points in effort to achieve monotonic chart boundaries. In some embodiments, these perturbations may be applied to the fidelity term(s) of the cost functions.

Method 10 commences in block 12, which involves a computer system receiving an input model 14 that represents an input object (not expressly shown). Input model 14 may comprise a digital representation implemented on a computer system which models the characteristics of the input object. Input model 14 may generally model any input object. For example, input model 14 may comprise object model representations generated by computer systems using modelling software such as SolidWorks™, Blender™, AutoCAD™, Autodesk Maya™, and/or other suitable software. In particular embodiments, input model 14 may comprise a volumetric model, which comprises a plurality of surface points (i.e. points intended to be on the surface of the input object) and a plurality of interior points (i.e. points intended to be on an interior of the input object). This is not necessary, however, and in some embodiments, all-monotone polycube segmentation 22 can be generated by a computer system performing method 10 when block 12 receives only a surface model of the input object.

In some embodiments, input model 14 comprises a mesh-based representation of the input object. In particular embodiments, input model 14 may comprise an isotropic volumetric mesh, which may comprise a tetrahedral mesh (tet-mesh). In such a volumetric tet-mesh representation, input model 14 comprises a plurality of notional tetrahedrons, which model the input object. A typical input model 14 may comprise on the order of $10^5$, $10^7$, or more notional tetrahedrons. The surface points and interior points of input model 14 may comprise the vertices of the notional tetrahedrons. Each notional tetrahedron may also comprise a plurality of linear edges that extended between corresponding pairs of vertices and a plurality of triangular faces defined by corresponding triplets of edges. In some embodiments, input model 14 may comprise a surface triangular mesh. Isotropic volumetric tet-meshes can be generated from surface meshes or otherwise generated using known techniques.

In some embodiments, input model 14 may comprise other forms of surface polygonal-mesh or volumetric polyhedral-mesh representations of the input object. Such polygonal surface meshes may comprise notional polygons comprising a corresponding plurality of surface vertices, a plurality of surface edges that extend between corresponding pairs of vertices and a plurality of faces defined by corresponding pluralities of edges. Such polyhedral mesh representations may comprise notional polyhedrons comprising a corresponding plurality of vertices, a plurality of edges that extend between corresponding pairs vertices and a plurality of faces defined by corresponding pluralities of edges. To ease the burden of explanation, it is assumed throughout the remainder of this disclosure (without the loss of generalization and unless the context dictates otherwise) that the surface points and interior points of input model 14 comprise the vertices of a tet-mesh representation and that the tet-mesh input model also comprises corresponding edges and triangular faces. Unless the context dictates otherwise, references to triangles and/or triangular faces should be understood to be capable of generalization to other shapes of the faces of other polyhedra.

In some embodiments, block 12 may optionally involve a computer system selecting and/or receiving a global Cartesian coordinate system (i.e. global (±X,±Y,±Z) axes) which will be used for the purposes of subsequent processing of input object 14. The block 12 selection of the global Cartesian coordinate system may be provided by a user, may be automatically assigned by the computer system or may be part of input object model 14. This block 12 selection of global Cartesian coordinate system may be based on the shape of the input object as represented by input model 14. For example, if the input model 14 can be interpreted to have one or more flat (i.e. planar) surfaces, then the block 12 coordinate system selection may be made such that such planar surfaces correspond to particular axes of the global coordinate system. In some embodiments, other criteria relating to the shape of input model 14 may be used to select the global Cartesian coordinate system. Selection of a global Cartesian coordinate system is not necessary. In some embodiments, the block 10 global Cartesian coordinate system may be received (e.g. as part of input model 14 or otherwise) or arbitrarily assigned.

Returning to FIG. 2, after receiving input model 14, the computer system performing method 10 proceeds to block 16 which involves generating an initial polycube labeling 18 which comprises, for each surface triangle of input model 14, assigning an initial label which is one of six directions (±X,±Y,±Z) aligned with a set of Cartesian axes. In general, initial polycube labeling 18 is a polycube segmentation, but unlike updated polycube segmentation 22 (discussed in more detail below), initial polycube labeling 18 may, in the general case, be permitted to comprise charts with non-monotone boundaries and may not satisfy all of the aforementioned criteria sufficient for a valid polycube segmentation. In particular embodiments, the generation of initial polycube labeling 18 may comprise effecting, by the computer system, a tradeoff between competing objectives of: making initial polycube labeling 18 relatively compact (e.g. with a relatively low number of initial charts and/or a relatively low number of chart corners and/or relatively low chart boundary lengths and/or some other suitable metric of compactness); and making initial polycube labeling 18 relatively faithful to input model 14 (e.g. by providing, for each surface triangle of input model 14, a relatively small angle between its assigned initial label and a normal vector of the surface triangle).

In particular embodiments, the computer system effects this tradeoff between these competing objectives in block 16 by performing an initial discrete computational optimization which effects an initial balance between these competing objectives. In some embodiments, the block 16 generation of initial polycube labeling 18 involves a computer system applying these objectives on a local scale. The resulting initial polycube labeling 18 may be said be a locally optimum labeling. In particular embodiments, this block 16 computational generation of initial polycube labeling 18 involves a computer system performing a discrete optimization which minimizes a cost function (also known as an energy function or an objective function).

In some embodiments, the computer system uses such a cost function to assign cost based at least in part on faithfulness (or fidelity) of the initial polycube labeling 18 to the surface geometry of input model 14 and to assign cost based at least in part on compactness of the initial polycube labeling 18. In some embodiments, the computer system uses such a cost function to assign cost based at least in part on a metric that is associated with (or correlated with) faithfulness (or fidelity) of the initial polycube labeling 18 to the surface geometry of input model 14 and/or to assign cost based at least in part on a metric that is associated with (or correlated with) compactness of the initial polycube labeling. In some embodiments, such a cost function comprises a first term (referred to herein as a fidelity term), which is based at least in part on a metric of (or models) the faithfulness (or fidelity) of initial polycube labeling 18 to the surface geometry of input model 14 and a second term (referred to herein as a compactness term), which is based at least in part on a metric of (or models) the compactness of initial polycube labeling 18. An example of such a cost function is provided by equation (1):

$$E(S) = \Sigma_{t \in T} F_t(s_t) + c\Sigma_{pq \in E} C_{pq}(s_p, s_q) \qquad (1)$$

where: s represents a label which may be assigned to a particular surface triangle of input model 14 and s is an element of the set $\{+X, -X, +Y, -Y, +Z, -Z\}$, $F_t(s_t)$ is a fidelity term which prescribes a cost of assigning the label $s_t$ to a surface triangle t; $C_{pq}(s_p, s_q)$ is a compactness term which prescribes a cost associated with assigning the label $s_p$ to a surface triangle p and a label $s_q$ to a surface triangle q, where surface triangle q is adjacent surface triangle p; T represents the set of surface triangles on input model 14; E represents the set of surface edges in input model 14; and c represents a relative weight (which may be user-configurable) between the fidelity term and the compactness term. It will be appreciated that the higher the value of the relative weight c, the greater the influence of the compactness term on the cost function E(s) and the lower the value of the relative weight c, the greater the influence of the fidelity term on the cost function E(s).

One local proxy (i.e. metric) associated with parameterization distortion which can be used by the computer system as a basis for the fidelity term is the angle between the normal vector of each surface triangle (of input model 14) and the oriented axis of the label assigned to the face by the block 16 initial labeling. The fidelity term may prescribe relatively high cost when the angle between the normal vector of a surface triangle and the oriented axis of its block 16 assigned label is relatively high and may prescribe a relatively low cost when the angle between the normal vector of a surface triangle and the oriented axis of its block 16 assigned label is relatively low. In particular non-limiting embodiments, the cost $F_t(s)$ of assigning label s to surface triangle t is given by:

$$F_t(s) = 1 - e^{-\frac{1}{2}\left(\frac{\vec{n}_t \cdot \vec{s} - 1}{\sigma}\right)^2} \qquad (2)$$

where $\vec{n}_t$ is the normal vector of the surface triangle (e.g. as described by, or otherwise determinable from, input model 14), $\vec{s}$ is the direction of the assigned label and σ is a user-configurable term which is associated with the spread of the Gaussian function. Setting σ=0.2 yields a labeling cost that ranges from 0 (when $\vec{n}_t$ and $\vec{s}$ are aligned) to ~1 (when $\vec{n}_t$ and $\vec{s}$ are at and angle of 65° from one another). It is noted that a normal $\vec{n}_t$ that is equidistant to each of the X, Y and Z axes will be at ~55° degree angle to each of the axes. Accordingly, the equation (2) fidelity cost term weakly differentiates between labeling costs when these angles are close to 55°.

The compactness term may prescribe relatively high cost when the labels applied to charts change frequently (corresponding to a relatively large number of charts or relatively short chart boundary lengths) and relatively low cost when the labels applied to charts are relatively constant (corresponding to a small number of charts or relatively long chart boundary lengths). Accordingly, in some embodiments, the computer system sets the compactness term $C_{pq}(s_p, s_q)$ to 0 when adjacent triangles p and q share the same label. In some embodiments, where the labels assigned to adjacent triangles p and q, the computer system may base the compactness term $C_{pq}(s_p, s_q)$ at least in part on the dihedral angle between the normal vectors ($\vec{n}_p$, $\vec{n}_q$) of the adjacent triangles. In some embodiments, the adjacent triangles p and q may be immediately adjacent faces (i.e. triangles that share a common edge). In other embodiments, other suitable metrics of adjacency may be used for the purposes of evaluating the compactness term $C_{pq}(s_p, s_q)$. In particular embodiments, the compactness term $C_{pq}(s_p, s_q)$ for adjacent triangles p and q is given by:

If labels to be assigned are the same:

$$C_{pq}(s_p, s_q) = 0 \qquad (3a)$$

and
If labels to be assigned are different:

$$C_{pq}(s_p, s_q) = e^{-\frac{1}{2}\left(\frac{\vec{n}_p \cdot \vec{n}_q - 1}{\sigma}\right)^2} \qquad (3b)$$

where σ is a user-configurable term which is associated with the spread of the Gaussian function. Setting σ=0.25 yields a cost of 1 where co-planar surface triangles are to be assigned different labels down to ~$e^{-8}$ where orthogonal surface triangles are to be assigned different labels.

In other particular embodiments, the compactness term $C_{pq}(s_p, s_q)$ for adjacent triangles p and q is given by:
If labels to be assigned are the same:

$$C_{pq}(s_p,s_q)=0 \quad (3a')$$

and
If labels to be assigned are different:

$$C_{pq}(s_p,s_q)=1 \quad (3b')$$

Once a cost function is established, then the computer system may perform a discrete optimization to minimize (or otherwise optimize) the cost function at block 16. The outputs of the computer system after performing the block 16 optimization are the initial surface labels (±X,±Y,±Z) for the surface triangles of input model 14 which make up initial polycube labeling 18. Any suitable discrete optimization or labeling technique may be used by the computer system to perform the block 16 computational optimization. In some embodiments, the fidelity costs are determinable by the computer system independently of the compactness cost (e.g. in the case of the cost functions of equations (1), (2), (3a) and (3b). In some embodiments, the fidelity costs are determinable by the computer system on a per-triangle basis (i.e. independently of the fidelity costs of other triangles and/or costs generally of other triangles). In these embodiments (i.e. where fidelity costs are independently determinable), the computer system may, for each triangle, compute the fidelity costs associated with assigning each of the six surface labels (±X,±Y,±Z) as part of the block 16 discrete optimization. Although not expressly shown in FIG. 2, the computer system may output the initial fidelity costs associated with each of the six surface labels (±X,±Y,±Z) for each triangle at block 16 (e.g. as a part of initial polycube labeling 18 or as separate data related to initial polycube labeling 18). In the general case, however, the computer system need not output the fidelity costs at block 16, as (with some cost functions) it may not be possible to determine fidelity costs independently.

In one particular embodiment, the computer system uses a graph-cut multi-label optimization framework at block 16 as described at: http://vision.csd.uwo.ca/code/gco-v3.0.zip; BOYKOV, Y., AND KOLMOGOROV, V. 2001. An experimental comparison of min-cut/max-flow algorithms for energy minimization in vision. *IEEE Transactions on Pattern Analysis and Machine Intelligence* 26(9), 359-374; KOLMOGOROV, V., AND ZABIH, R. 2004. What energy functions can be minimized via graph cuts. *IEEE Transactions on Pattern Analysis and Machine Intelligence* 26(2), 65-81.; BOYKOV, Y., VEKSLER, O., AND ZABIH, R. 2001. Fast approximate energy minimization via graph cuts. *IEEE Transactions on Pattern Analysis and Machine Intelligence* 23(11), 1222-1239; all of which are hereby incorporated herein by reference.

In one particular embodiment, the computer system uses an iterative min-cut optimization framework at block 16. Such an iterative min-cut optimization technique may be as described by Bukard R. et al. in chapter 3 of "Assignment Problems" copyright 2009, Society for Industrial and Applied Mathematics, ISBN 978-0-898716-63-4, which is hereby incorporated herein by reference.

In some embodiments, the computer system may also be configured to account for one or more of the criteria described above for a valid polycube segmentation at the block 16 computational optimization. In particular, one of the aforementioned criteria for a valid polycube segmentation (which happens to be a locally evaluable criterion) is that no two charts of a valid polycube segmentation which share a chart boundary may have opposing label orientations along the same axis (e.g. +Z and −Z). In particular embodiments, the computer system prevents two adjacent surface triangles p and q which share an edge or a vertex from being assigned opposite direction labels (i.e. +X and −X; +Y and −Y; or +Z and −Z) at block 16. This criteria may be accounted for by the computer system in block 16 by adding an additional term to the cost function which assigns a cost to this type of labeling which is effectively infinity (e.g. sufficiently high) to prevent this type of labeling altogether. Additionally or alternatively, the computer system may be configured to be a constrained optimization in which preventing this type of labeling is a constraint to the block 16 optimization problem.

Alternatively, or in addition, the computer system may allow adjacent surface triangles p and q which share an edge or a vertex to be initially assigned opposite direction labels, and, in response to detecting such an arrangement, the computer system may relabel one of the charts to which p and q belong so that the relabeled chart does not oppose the other (non-relabeled) chart containing either p or q. For example, the relabeled chart may be assigned the label of one of its neighbouring charts. The computer system may select between the charts of p and q arbitrarily, based on the relative sizes of the charts (e.g. by preferring to relabel the smaller chart), pseudo-randomly, based on user selection, and/or based on other factors. The computer system may perform such relabeling steps, if necessary, when generating an initial polycube labelling 18 at block 16 and/or when generating updated polycube segmentations 22 at block 20.

A second locally evaluable criteria for a valid polycube segmentation is that each chart corner (chart vertex) of polycube segmentation 22 has a valence of three—i.e. is a vertex for three charts. This criterion may be accounted for after initial polycube labeling 18 is generated in block 16. The computer system may examine initial polycube labeling 18 and, if corners having a valence greater than three are detected in initial polycube labeling 18, the computer system may reject the initial polycube labeling 18 and the computer system may repeat block 16 with additional constraints that, for each offending corner, the surface triangles in the one-ring surrounding the offending corner (i.e. the faces in contact with the corner) are assigned a particular label. The computer system may select the particular label using a number of suitable techniques. In one example, the particular label may be selected to be the label initially assigned to the surface triangle in the one ring having the largest area. In another example, the particular label may be selected to be the label initially assigned to the greatest number of surface triangles in the one ring. In still another example, if two initially assigned labels in the one ring have opposing sings on the same axis, then another one of the labels initially assigned to the one ring may be selected to the particular label. Combinations of these techniques may also be used to select the particular label. The particular label may also be arbitrarily selected. The assignment of the particular label may be accomplished by setting the cost of the particular label to be zero for these surface triangles and effectively infinity for all other labels.

Figure 2A:
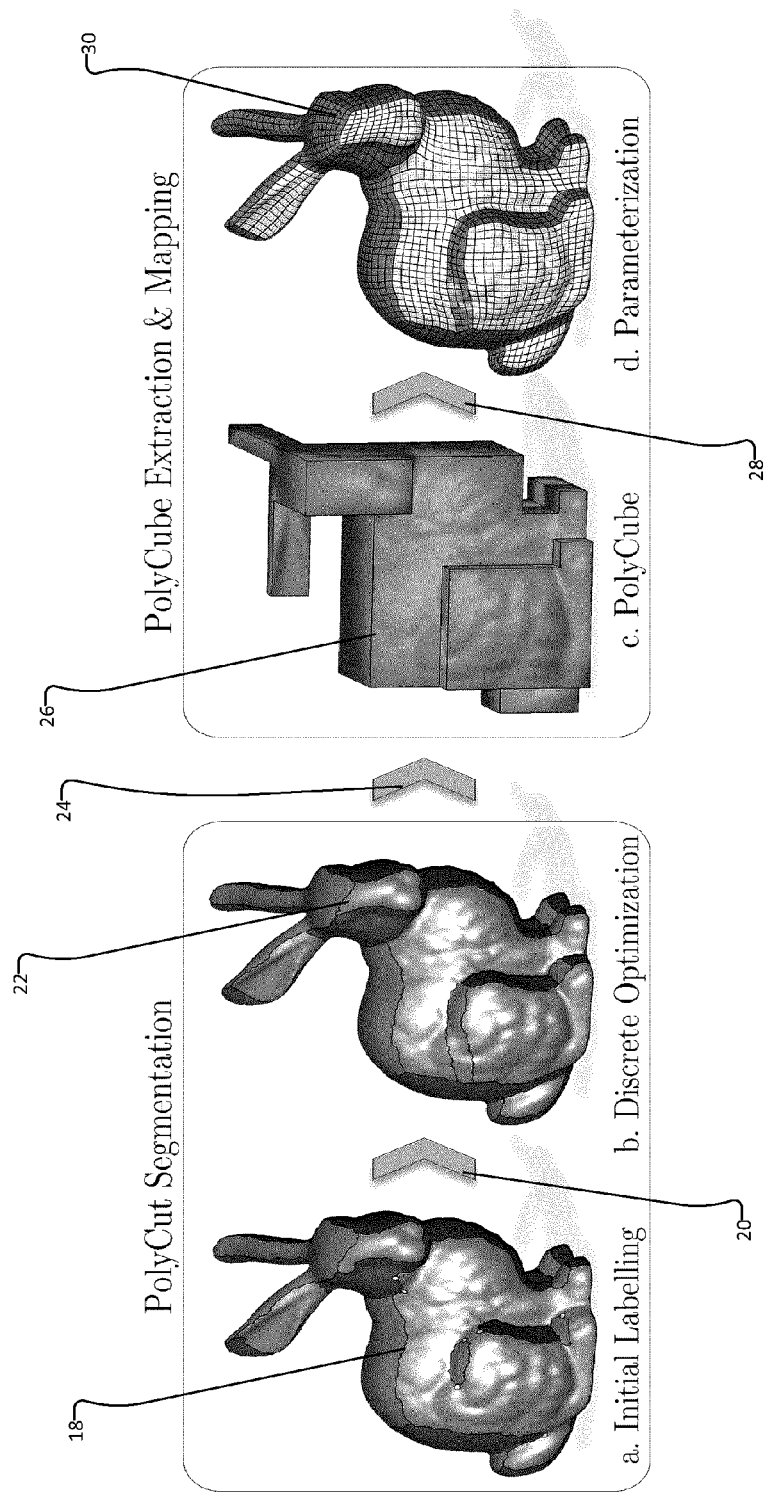
FIG. 2A is a graphical depiction of the application of the FIG. 2 methods to an exemplary input object.

At the conclusion of block 16, the computer system has generated an initial polycube labeling 18 which assigns initial surface labels (±X,±Y,±Z) to the surface triangles of input model 14. Although not expressly shown in FIG. 2, in embodiments where the fidelity costs are independently determinable, block 16 may also comprise generating the initial fidelity costs associated with each of the six surface labels (±X,±Y,±Z) and these fidelity costs may also be output from the computer system at block 16 (e.g. as a part of initial polycube labeling 18 or as separate data related to initial polycube labeling 18). Further, in some embodiments, initial polycube labeling 18 will satisfy the polycube segmentation criteria that: no two charts in initial polycube labeling 18 which share a chart boundary will have opposing labels along the same axis and/or all chart corners in initial polycube labeling 18 will have a valence of three. FIG. 2A shows an example of an initial polycube labeling 18 for an exemplary input object. Different colors of the FIG. 2A initial polycube labeling represent different labels. An outstanding issue with initial polycube labeling 18 is that it includes non-monotone chart boundaries. The turning points of the chart boundaries of the FIG. 2A initial polycube labeling 18 are shown as highlighted circles.

Returning to FIG. 2, the computer system performing method 10 proceeds to block 20, which involves generating an updated polycube segmentation 22 with all-monotone chart boundaries. Generating updated polycube segmentation 22 may comprise, for each of one or more surface triangles, the computer system changing the assigned initial label of initial polycube labeling 18 to an updated label and thereby modifying one or more of the initial charts of initial polycube labeling 18 to provide updated polycube segmentation 22 with updated charts, where the boundaries of the updated charts are all monotonic. While performing the block 20 update, it may be desirable for the computer system to maintain (to the extent possible) the balance achieved in block 16 with respect to the tradeoff between compactness and fidelity. This balance may be achieved by attempting to minimally change the labels assigned to initial polycube labeling 18 while achieving the block 20 objective of achieving all-monotone chart boundaries. In some embodiments, block 20 involves: identifying one or more turning points in initial polycube labeling 18; and performing one or more perturbed discrete computational optimizations, wherein the perturbed computational optimizations re-label the surface triangles of non-monotone charts (i.e. charts whose boundaries are non-monotone or whose boundaries have turning points). Such perturbed computational optimizations may comprise using one or more perturbed cost functions in the vicinities of the turning points (e.g. in corresponding regions around the turning points). The computer system may perform such perturbed computational optimizations iteratively, with a relatively small amount of perturbation to the cost function performed in each iteration. In some embodiments (e.g. where fidelity costs are independently determinable), each iteration may also comprise determining the perturbed fidelity costs for various triangles and updating the segmentation using a computational discrete optimization process. The perturbed fidelity costs and/or the updated segmentation may be carried forward to the next iteration, to thereby implement a so-called hill climbing process.

The perturbed discrete computational optimizations performed by the computer system in block 20 may be similar to the computational optimization performed in block 16 in the sense that they may be based at least in part on cost functions which assign cost based at least in part on faithfulness (or fidelity) of updated polycube segmentation 22 to the surface geometry of input model 14 and assign cost based at least in part on compactness of updated polycube labeling 22. The cost functions used in the perturbed computational optimizations performed in block 20 may be referred to herein as perturbed cost functions. In some embodiments, such perturbed cost functions assign cost based at least in part on metrics associated with (or corre-lated with) faithfulness (or fidelity) of updated polycube segmentation 22 to the surface geometry of input model 14 and assign cost based at least in part on metrics associated with (or correlated with) compactness of updated polycube segmentation 22. In some embodiments, such perturbed cost functions comprise first term (referred to herein as a fidelity term), which is based at least in part on a metric of (or models) the faithfulness (or fidelity) of updated polycube labeling 22 to the surface geometry of input model 14 and a second term (referred to herein as a compactness term), which is based at least in part on a metric of (or models) the compactness of updated polycube labeling 22. The compactness term of the perturbed cost functions used by the computer system in block 20 may be based at least in part on the number of updated charts in updated polycube representation 22 and/or the number of corners in updated polycube representation 22 and/or the length of the chart boundaries in updated polycube representation 22 and/or some other suitable metric of compactness. The fidelity term of the perturbed cost functions used by the computer system in block 20 may be based at least in part on, for each surface triangle, the angle between its assigned updated label (in updated segmentation 22) and the normal vector of the surface triangle of input model 14. The perturbed computational optimizations performed by the computer system in block 20 may differ from the block 16 computational optimization in that the block 20 discrete perturbed computational optimizations may introduce various perturbations into the cost functions in effort to resolve non-monotonicities (turning points) in the segmentation. The perturbed computational optimizations performed by the computer system in block 20 may involve an iterative ("hill climbing") approach, which iteratively introduces small incremental perturbations (and carries forward the updated segmentations and/or perturbed fidelity costs) in effort to resolve turning points with a minimal amount of perturbation.

Figure 3:
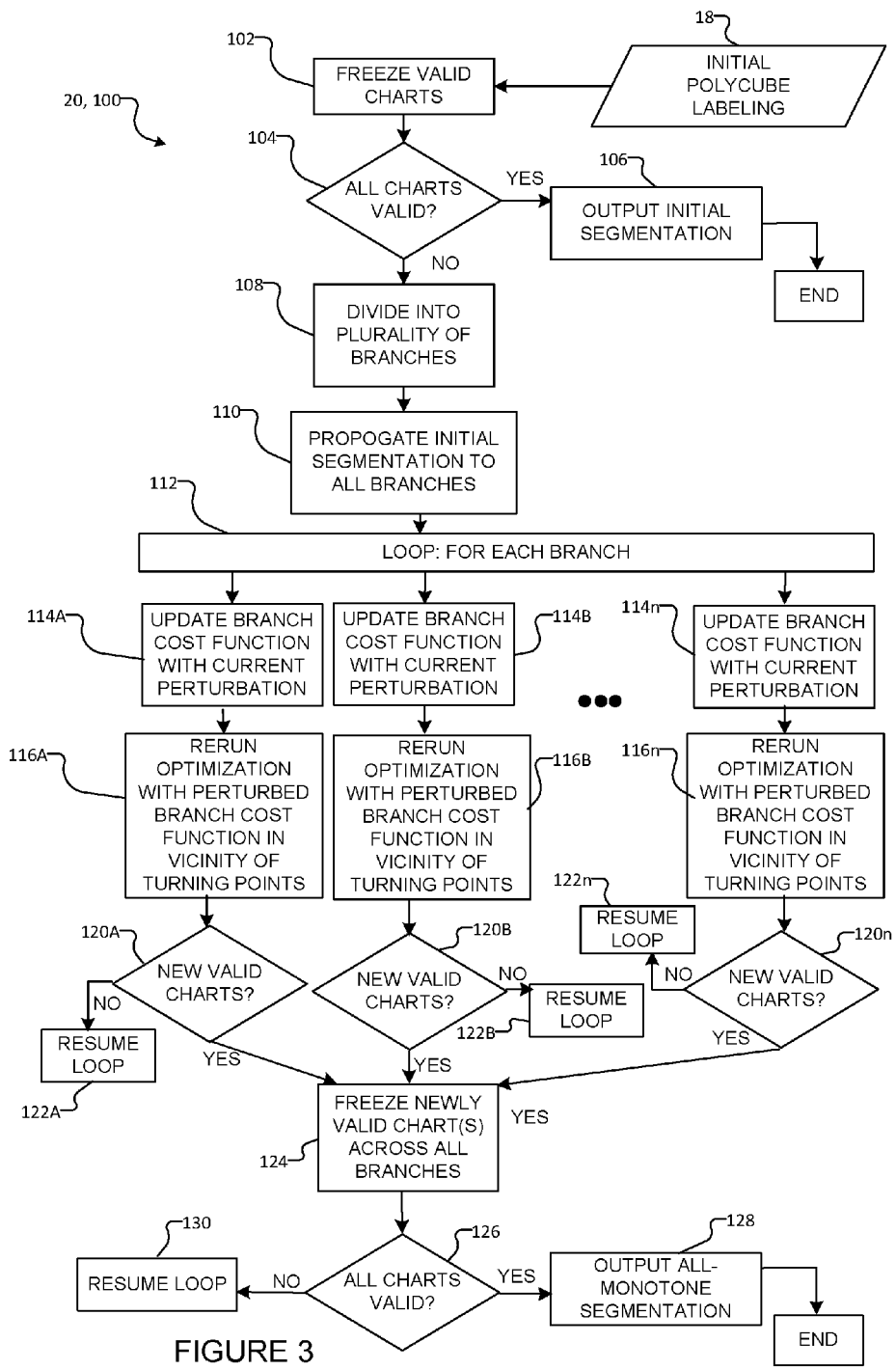
FIG. 3 is a schematic depiction of a computer-implemented method for generating an updated polycube segmentation, which may be used in the FIG. 2 methods according to a particular embodiment.

FIG. 3 is a schematic depiction of a method 100 which may be performed by the computer system to implement the procedures of block 20 according to a particular embodiment. Method 100 commences in block 102, in which the computer system considers initial polycube labeling 18 and "freezes" the labels for all charts having monotonic boundaries. For brevity, charts with all-monotone or monotonic chart boundaries may be referred to herein as monotonic charts, all-monotone charts or valid charts. In particular embodiments, the block 102 chart freezing may involve, for each monotonic chart to be frozen: removing the chart's triangles from subsequent labeling operations (e.g. blocks 116A-116n described further below); and adding constraints to subsequent method 100 labeling operations which prevent any triangle that shares an edge or vertex with the frozen chart from being assigned either the same label as the frozen chart or the axially opposing label as the frozen chart. After freezing monotonic charts, method 100 proceeds to block 104, which involves the computer system evaluating whether there are any charts with turning points on their boundaries (i.e. non-monotonic charts). If the answer to the block 104 evaluation is that all charts are monotonic (the YES branch of block 104), then method 100 proceeds to block 106 where the computer system outputs the initial polycube labeling 18 segmentation as updated polycube segmentation 22 and then ends. If there are any charts with turning points on their boundaries (the NO branch of block 104), method 100 proceeds to block 108.

One or both of blocks 102 and 104 may involve the computer system searching for turning points along chart boundaries of initial polycube labeling 18. As discussed above, a boundary between a pair of immediately adjacent charts will have a known axial orientation in the final polycube representation based on the labels applied to its adjacent charts. One technique for searching for turning points involves examining the directional vectors on the edges of each surface triangle that makes up a chart boundary and computing their dot products with the expected axial direction of the boundary. A change in the sign of this dot product may be indicative of a turning point. The inventors have determined that performing this examination on each surface triangle is sensitive to local mesh connectivity and can be undesirably noisy.

Consequently, in some embodiments, a more robust technique is used to search for turning points which involves the assignment of either a positive (+) or negative (−) label to each of the surface triangle edges on a chart boundary. This turning point search technique may comprise a computation optimization, which assigns either a positive or negative label to each triangle edge on the chart boundaries. In some embodiments, the cost function for this optimization may comprise, for each triangle edge on a chart boundary, the sum of a unary term (which depends on the particular triangle edge in consideration) and a binary term (which depends on the relationship between the particular triangle edge and its neighboring triangle edge(s)). In some embodiments, the unary term comprises a Gaussian fall-off function similar to equation (2) described above where the dot product in the exponent involves the orientation vector of the particular triangle edge in consideration and the vector describing the expected axial direction of its chart boundary. In some embodiments, the binary term is similar to equations (3a) and (3b) described above and is zero when consecutive triangle edges have the same direction and is otherwise a Gaussian function where the dot product in the exponent is the dot product of the orientation vectors of the consecutive triangle edges. In some embodiments, the binary term is zero when consecutive triangle edges have the same direction and is unity otherwise. In some embodiments, the optimization may be performed serially over the set of surface boundaries. In some embodiments, the computer system may use the above-discussed graph-cut technique as part of the inquiry into whether boundaries are monotonic and corresponding charts are valid. For example, the computer system may solve a graph-cut problem on the edges of the boundary. In some embodiments, the computer system may use dynamic programming to determine whether a boundary is monotonic or non-monotonic. For example, the computer system may implement a Viterbi algorithm or some other technique making use of probabilistic Markov chains to determine (non-)monotonicity.

If, for a particular chart boundary, this labeling optimization determines that the labels assigned to the triangle edges on that boundary switch signs (i.e. from positive to negative or from negative to positive), then the vertex of the triangle edge where this sign change occurs is determined to be a turning point. That is, if this labeling optimization assigns more than one label to the set of all triangle edges on a particular chart boundary, then any vertex along the boundary where there is a label change (between adjacent triangle edges) may be determined to be a turning point. Returning to method 100 (FIG. 3), if any chart boundaries are determined to have turning points (block 104 NO branch), then method 100 proceeds to block 108.

As discussed above, the computer system may perform a perturbed computational optimization at block 20 (and hence during method 100). Block 108 involves dividing this perturbed optimization into a plurality of perturbation branches. In particular embodiments, perturbations are applied to the fidelity term of the cost function used in block 16 (FIG. 2)—e.g. perturbations may be applied to the fidelity term $F_f(s)$ of the equation (1) cost function. This is not necessary, however, and the computer system may, while performing method 100, otherwise introduce perturbations into the cost function used in block 16 and/or may involve the use of perturbed cost functions that are different altogether from the cost function used in block 16. In some embodiments, the applied perturbations assign relatively higher cost (or relatively lower cost) to assigning one or more particular label(s) (±X,±Y,±Z) to particular surface triangles. In some embodiments, one convenient way to divide the perturbed optimization is into six branches, which include:

(i) $X_{more}$: perturbation assigns greater cost to X-axis labelings (±X);

(ii) $X_{less}$: perturbation assigns less cost to X-axis labelings (±X);

(iii) $Y_{more}$: perturbation assigns greater cost to Y-axis labelings (±Y);

(iv) $Y_{less}$: perturbation assigns less cost to Y-axis labelings (±Y);

(v) $Z_{more}$: perturbation assigns greater cost to Z-axis labelings (±Z); and (iii) $Z_{less}$: perturbation assigns less cost to Z-axis labelings (±Z).

The computer system may using these six branches to effectively reduce the search space from $O(6^{|t|})$ to $O(|t|)$, or from exponential to linear time, which may substantially improve performance of the computing system during method 100.

In some embodiments, other criteria could be used by the computer system to define the block 108 branches A, B, . . . n. By way of non-limiting example, six branches could be created which apply perturbations which favor (i.e. provide lower cost for)+X labeling, −X labeling, +Y labeling, −Y labeling, +Z labeling and −Z labeling. In some embodiments, the number of block 108 branches A, B . . . n may additionally or alternatively be changed. By way of non-limiting example, the number of branches A, B, . . . n could be changed to three by dropping the $X_{more}$, $Y_{more}$ and $Z_{more}$ branches or could be changed to twelve by expanding each of the above-listed branches to perturb only one direction on its corresponding axis—e.g. $X_{more}$ could be divided into $+X_{more}$ (which perturbs the cost function to assign greater cost to the +X labeling only) and $-X_{more}$ (which perturbs the cost function to assign greater cost to the −X labeling only).

Once branches A, B, . . . n are determined in block 108, the computer system proceeds to block 110 in method 100, where initial polycube labeling 18 may be propagated (e.g. made available to) each of branches A, B, n and becomes that starting segmentation for each of branches A, B, . . . n. In some embodiments (e.g. where the cost functions are such that fidelity costs are independently determinable) block 110 may also involve the computer system propagating the various fidelity costs associated with each label for each triangle determined in block 16 (FIG. 2). These fidelity costs may become the starting fidelity costs for each of branches A, B, . . . n. As discussed above, these block 16 fidelity costs may comprise a part of initial polycube labeling 18. The segmentation for each of branches A, B, . . . n may be referred to herein as a branch segmentation and the various fidelity costs associated with each label for each triangle in each branch A, B, . . . n may be referred to herein as the branch costs or the branch fidelity costs. Accordingly, initial polycube labeling 18 (and possibly the associated fidelity costs determined in block 16) may provide the initial branch segmentation and branch fidelity costs for each of branches A, B, . . . n. The computer system may then proceed in method 100 to block 112, which involves setting up a looping procedure, wherein the steps of each branch A, B . . . n (e.g. steps 114A-114*n*, 116A-116*n* and 120A-120*n* in the case of the illustrated embodiment) are performed either serially or in parallel and then, when the steps of each branch A, B . . . n are performed, the loop iterates for a subsequent iteration of the steps for all branches A, B . . . n. During this looping procedure, the computer system may iteratively update the individual branch segmentations and branch fidelity costs as described in more detail below.

In the first branch, the computer system proceeds to block 114A in method 100, which involves updating the branch cost function (and/or the branch fidelity costs) with the current branch perturbation. In the first iteration of method 100, block 114A involves the computer system applying a branch perturbation to the initial cost function (and/or the initial branch fidelity costs) to obtain the branch cost function. As discussed above, in some embodiments, the initial (unperturbed) cost function is the same cost function used in block 16 to generate initial polycube labeling 18 and the initial branch fidelity costs (where used) are the same costs generated in block 16 to determine initial polycube labeling 18), although this is not necessary and other cost functions may be used for the initial (unperturbed) cost function and associated initial branch fidelity costs (where used) in the first iteration of block 114A. As discussed in more detail below, the branch perturbation may be applied to one or more particular triangles (e.g. triangles in the vicinities of the turning points of the current branch segmentation). In the first iteration of block 114A, the branch segmentation may be initial polycube labeling 18 (which may be propagated to branches A, B, . . . n in block 110, as described above).

In a general iteration of block 114A, the cost function which is perturbed in block 114A is the perturbed branch cost function of the previous iteration of branch A. Similarly, in a general iteration of block 114A which makes use of branch fidelity costs, the branch fidelity costs which are perturbed in block 114A are the branch fidelity costs determined in the previous iteration of branch A. In some embodiments, the branch perturbation applied in block 114A is an additive perturbation applied to the fidelity term of the perturbed branch cost function of the previous iteration of branch A for particular triangles (e.g. triangles in the vicinities of the turning points of the current branch segmentation). In other embodiments, the branch perturbation applied in block 114A otherwise perturbs the perturbed branch cost function of the previous iteration of branch A for particular triangles (e.g. triangles in the vicinities of the turning points of the current branch segmentation). In some embodiments, the branch perturbation applied in block 114A is an additive perturbation that adds to the branch fidelity costs determined in the previous branch A iteration (or reduces the branch fidelity costs determined in the previous branch A iteration) of assigning one or more particular labels to particular triangles (e.g. to triangles in the vicinities of the turning points of the current branch segmentation).

Since the branch perturbations are applied to particular triangles (e.g. to triangles in the vicinities of turning points of the current branch segmentation), block 114A may involve searching for turning points in the current branch segmentation. The computer system may use a procedure similar to that described above for blocks 102, 104 in block 114A to locate turning points in the current branch segmentation. As mentioned above, the computer system applies the block 114A perturbations to particular triangles in the vicinities of the turning points in the current branch segmentation. Any suitable technique could be used in block 114A to determine the size of these vicinities of (e.g. local regions around) the turning points in the current branch segmentation. In some embodiments, the regions around the turning points in the current branch segmentation may comprise constant or user-configurable sized regions. In some embodiments, the radii, or some other metric of the sizes, of the regions around the turning points in the current branch segmentation may be determined by some suitable percentage (e.g. 2%, 5% or 10%) or some other suitable function of the diagonal length of a bounding box (e.g. an axis-aligned box) or bounding sphere that contains input model 14. In some embodiments, other criteria may be used to determine the size of the corresponding regions around the turning points in the current branch segmentation.

The branch perturbation applied in block 114A is particular to the branch A defined in block 108. For example, if branch A corresponds to $X_{more}$ (as described above), then updating the branch cost function with the branch perturbation in block 114A will involve perturbing the cost function to provide greater cost to assigning the labels +X and −X to particular surface triangles (e.g. to triangles in the vicinities of the turning points of the current branch segmentation). By way of similar example, if branch A corresponds to $X_{more}$ (as described above), then perturbing the branch fidelity costs (in embodiments where such branch fidelity costs are used) may involve increasing the branch fidelity costs associated with the labels +X and −X for particular surface triangles (e.g. for triangles in the vicinities of the turning points of the current branch segmentation). As another example, if branch A corresponds to $X_{less}$ (as described above), then updating the branch cost function with the branch perturbation in block 114A will involve the computer system perturbing the cost function to provide lower cost to assigning the labels +X and −X to particular surface triangles (e.g. to triangles in the vicinities of the turning points of the current branch segmentation) and/or perturbing the branch fidelity costs (in embodiments where such branch fidelity costs are used) may involve decreasing the branch fidelity costs associated with the labels +X and −X for particular surface triangles (e.g. for triangles in the vicinities of the turning points of the current branch segmentation).

The amplitude of the branch perturbation applied in block 114A may be configured to implement a suitable tradeoff between lower computational expense (achieved with relatively high amplitude branch perturbation) and a relatively high degree of fidelity to input model 14 or relatively low degree of parameterization distortion (achieved with relatively low amplitude branch perturbation). In some embodiments, the amplitude of the block 114A branch perturbations may be increased after each iteration branch A (or after a plurality of iterations of branch A) to help resolve turning points, although increasing the amplitude of the block 114A branch perturbations is not necessary.

After updating the perturbed branch cost function (and/or the perturbed branch fidelity costs) in block 114A, the computer system proceeds to block 116A in method 100, which comprises performing a discrete computational optimization over all of the triangles in charts that have not been frozen in the current branch segmentation (i.e. over all non-monotonic charts or over all charts that have turning points in the current branch segmentation). The block 116A optimization may be similar to the computational optimization performed in block 16 (FIG. 2), except that: the relabelings prescribed by the block 116A optimization may be applied to the triangles in non-monotone charts only (i.e. monotone charts are frozen as described above (block 102) or as described below (block 124)); the computer system uses the block 114A perturbed branch cost function (and/or the block 114A perturbed branch fidelity costs) in the vicinities of any turning points in the current branch segmentation in the block 116A optimization; and the triangles adjacent to the edges of frozen charts may be subject to additional constraints in the block 116A optimization (see above discussion of freezing charts (block 102)). Inside of the non-monotone charts of the current branch segmentation, but outside of the vicinities of the remaining turning points in the current branch segmentation, the computer system may use the same cost function (and/or the same branch fidelity costs) as the previous iteration of branch A in the block 116A optimization. The cost function used in block 116A for triangles in non-monotone charts, but outside of the vicinities of the turning points of the current branch segmentation, may be referred to herein as the unperturbed branch cost function and the branch fidelity costs used in block 116A for triangles in non-monotone charts, but outside of the vicinities of the turning points of the current branch segmentation, may be referred to as unperturbed branch fidelity costs.

At the conclusion of block 116A, the computer system relabels the surface triangles in the non-monotone charts of the branch segmentation based on the block 116A optimization. The labels prescribed by the block 116A provide the new branch segmentation for branch A. Because the computer system may use the block 114A perturbed branch cost function (and/or the block 114A perturbed branch fidelity costs) in the vicinities of the outstanding turning points in the block 116A optimization, the updated labelings prescribed by block 116A may resolve one or more turning points in the new branch segmentation—i.e. once the triangles are relabeled in accordance with the block 116A optimization, chart boundaries that may have had one or more turning points in the branch segmentation of the previous iteration may no longer have turning points or may have fewer turning points in the new branch segmentation. It should also be noted that in the general case, the block 116A relabeling can also result in the creation of new turning points in the new branch segmentation and movement of turning points as between the previous branch segmentation and the new branch segmentation. The new block 116A branch segmentation may be saved or otherwise maintained, so that it may be used as the starting point for the next iteration of blocks 114A and 116A. As was the case for the discrete optimization performed in block 16 (described above), the branch fidelity costs for assigning the various labels to the various triangles in branch A (e.g. in block 114A and/or in block 116A) may also be saved or otherwise maintained (as a part of the new branch segmentation or otherwise) so that they may be used as the starting point for the next iteration of blocks 114A and 116A.

After performing the block 116A optimization, the computer system proceeds to block 120A in method 100, which involves an inquiry into whether there are any newly valid (monotonic) charts in the new block 116A branch segmentation—i.e. charts which were non-monotonic in the previous branch segmentation, but which became monotonic in new branch segmentation prescribed by the block 116A optimization. If the block 120A inquiry is negative, then the computer system proceeds to block 122A in method 100, which involves resuming the looping procedure set up in block 112. For example, in the case where the procedures for each of the branches are performed serially, block 122A may involve the computer system looping back to block 114B of branch B. If, however, the block 120A inquiry is positive (i.e. one or more turning points are resolved by the block 116A optimization to produce one or more corresponding newly monotonic charts in the new branch segmentation), then the computer system proceeds to block 124 in method 100 where those newly monotonic charts are frozen across the current branch segmentations in all branches. Block 124 is discussed in more detail below.

The procedures of block 114B-114n, 116B-116n and 120B-120n may be substantially similar to those of blocks 114A, 116A, 120A, except that the branch perturbations, the corresponding block 114B-114n perturbed branch cost functions (and/or perturbed branch fidelity costs) and the resultant block 116B-116n branch segmentations (and branch fidelity costs) are different for the various branches and correspond to the nature of their respective branches. For example, if branch B is $X_{less}$ (as described above), then the block 114B branch perturbation will reduce the branch fidelity costs associated with assigning the labels +X and −X to particular surface triangles (e.g. triangles in the vicinities of the current branch B branch segmentation) and if branch n is $Z_{less}$ (as described above), then the block 114n branch perturbation will reduce the cost of assigning the labels +Z and −Z to particular surface triangles (e.g. triangles in the vicinities of the current branch n segmentation. The looping procedure set up by block 112 may loop through the procedures of blocks 114A-114n, 116A-116n and 120A-120n in a serial manner or a parallel manner until one of the block 120A-120n inquiries is positive (i.e. there is a newly monotonic chart in any of the branch segmentations produced by any of the block 116A-116n optimizations), whereupon the computer system proceeds to block 124 in method 100.

In block 124, the computer system freezes any newly monotonic charts created in a particular branch segmentation (i.e. by a relabeling in one of blocks 116A-116n) across the branch segmentations of all branches A, B, . . . n. The chart freezing in block 124 may be similar to the freezing described above in block 102. The block 124 frozen charts are propagated to the current branch segmentations of all branches A, B, . . . n of method 100. Where branches A, B, . . . n are executed in parallel (which may be the case in some embodiments), it is possible that one or more turning points can be resolved to produce one or more newly monotonic charts in more than one branch. If such an event occurs, then block 124 may involve arbitrarily selecting the resolution of one of the branches by freezing each newly monotonic chart in accordance with the labeling prescribed by one of the block 116A-116n optimization. In other embodiments, the computer system may uses suitable criteria to choose one branch's labeling of the newly monotonic chart over the labeling prescribed by the other branch(es) in block 124. For example, block 124 may involve selecting the branch where the labeling of the newly monotonic chart changes the block 16 (FIG. 2) initial labeling 18 the least over the labeling prescribed by other branches.

At the conclusion of block 124, the computer system updates each branch segmentation with any newly monotonic chart(s) and these newly monotonic chart(s) are frozen for subsequent iterations of the procedures of branches A, B, . . . n. After block 124, the computer system proceeds to block 126 in method 100, which involves an inquiry as to whether all of the charts are valid. Since all monotonic charts are common to the branch segmentations of all branches A, B, . . . n (i.e. as a result of either the freezing and propagation of blocks 102 and 110 or as a result of the freezing and propagation of block 124), the computer system may consider at block 126 any one of the branch segmentations generated in blocks 116A-116n. If the block 126 inquiry is negative (i.e. there remain turning points in the segmentation under consideration), then the computer system proceeds to block 130 in method 100 which involves resuming the block 112 looping procedure in a manner similar to that discussed above for block 122A.

In this manner, the computer system performing method 100 continues to loop iteratively through the block 112 looping procedure by performing blocks 114A-114n, 116A-116n and 120A-120n for each of branches A, B, . . . n. The procedures of each branch A, B, . . . n may be performed serially or in parallel. Once these procedures are performed for each branch (e.g. where the computer system reaches block 122n or reaches block 130 in method 100 after a positive inquiry in block 120n), then the computer system performing method 100 may implement a subsequent iteration across all of the branches again at block 114A (in the serial case) or at blocks 114A-114n (in the parallel case). As discussed above, the number and locations of turning points in the various branch segmentations may change after each application of the block 116A-116n branch optimizations. Accordingly, the regions (around the turning points) in which the block 114A-114n perturbations are applied may also vary. This variation as between the locations of perturbations as between iterations may help to generate newly monotonic charts over one or more iterations. In some embodiments, the amplitude of the branch perturbations applied in blocks 114A-114n may be increased after each iteration of branches A, B, . . . n or after a plurality of iterations of branches A, B, . . . n to help resolve turning points, although increasing the amplitude of the branch perturbations in blocks 114A-114n is not necessary.

Returning to block 126, once the block 126 inquiry is positive (i.e. all of the charts in the segmentation under consideration are monotonic), then the computer system proceeds to block 128 in method 100 where the all-monotone segmentation is output as updated polycube segmentation 22 (FIG. 2). The iterative aspect of method 100 may be described as a hill climbing process, because a small amount of perturbation is applied to the branch cost function (and/or branch fidelity costs) in each iteration. This hill climbing process helps to achieve updated (all-monotone) segmentation 22 with minimal perturbation. As discussed above, the amplitude of the perturbations applied in blocks 114A-114n may be configured to implement a suitable tradeoff between lower computational expense (achieved with relatively high perturbation) and a relatively high degree of fidelity to input model 14 or relatively low degree of parameterization distortion (achieved with relatively low branch perturbation).

Figure 3A:
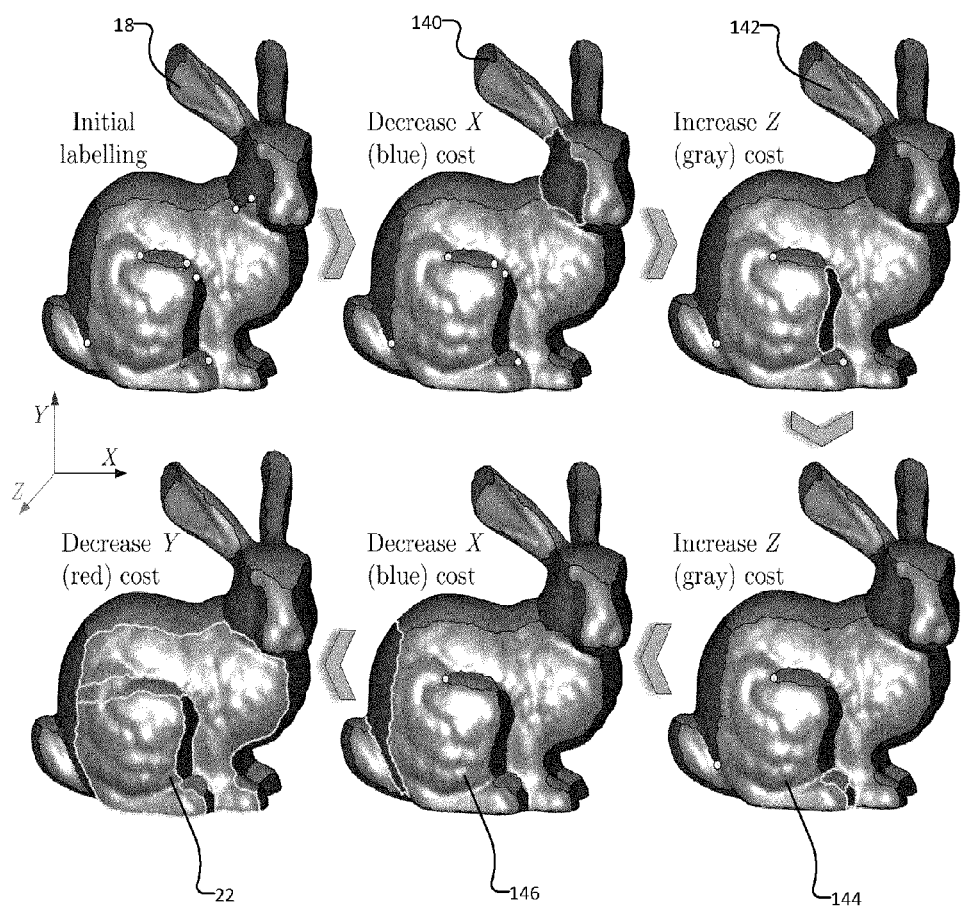
FIG. 3A is a graphical depiction of the application of the FIG. 3 method to an exemplary initial polycube labeling.

FIG. 3A is a graphical depiction of the application of the FIG. 3 method 100 to an exemplary initial polycube labeling. FIG. 3A shows an initial polycube labeling 18 in the upper left corner with the labels shown as different colors and the turning points shown as circles. Proceeding in a clockwise manner, FIG. 3A then shows a branch segmentation 140, which resolves a pair of turning points by applying an $X_{less}$ perturbation and thereby creates a newly monotonic chart. The newly monotonic chart in branch segmentation 140 is shown with a light outline and is propagated to all branches of method 100. In branch segmentation 142, another pair of turning points is resolved by applying a $Z_{more}$ perturbation, resulting in a newly monotonic chart shown in light outline and propagated to all branches. In branch segmentation 144, another turning point is resolved by applying a $Z_{more}$ perturbation, resulting in a pair of newly monotonic charts shown in light outline. Both of these charts are propagated across all branches. In branch segmentation 146, another turning point is resolved by applying an $X_{less}$ perturbation, resulting in a newly monotone chart shown in light outline which is propagated across all of the method 100 branches. The final (all-monotone) segmentation 22 shown in FIG. 3A is obtained by application of a $Y_{less}$ perturbation to resolve the final turning point, resulting in three new monotone charts shown in light outline. It will be appreciated that FIG. 3A is schematic in nature and may take place over multiple iterations of method 100.

Figure 4:
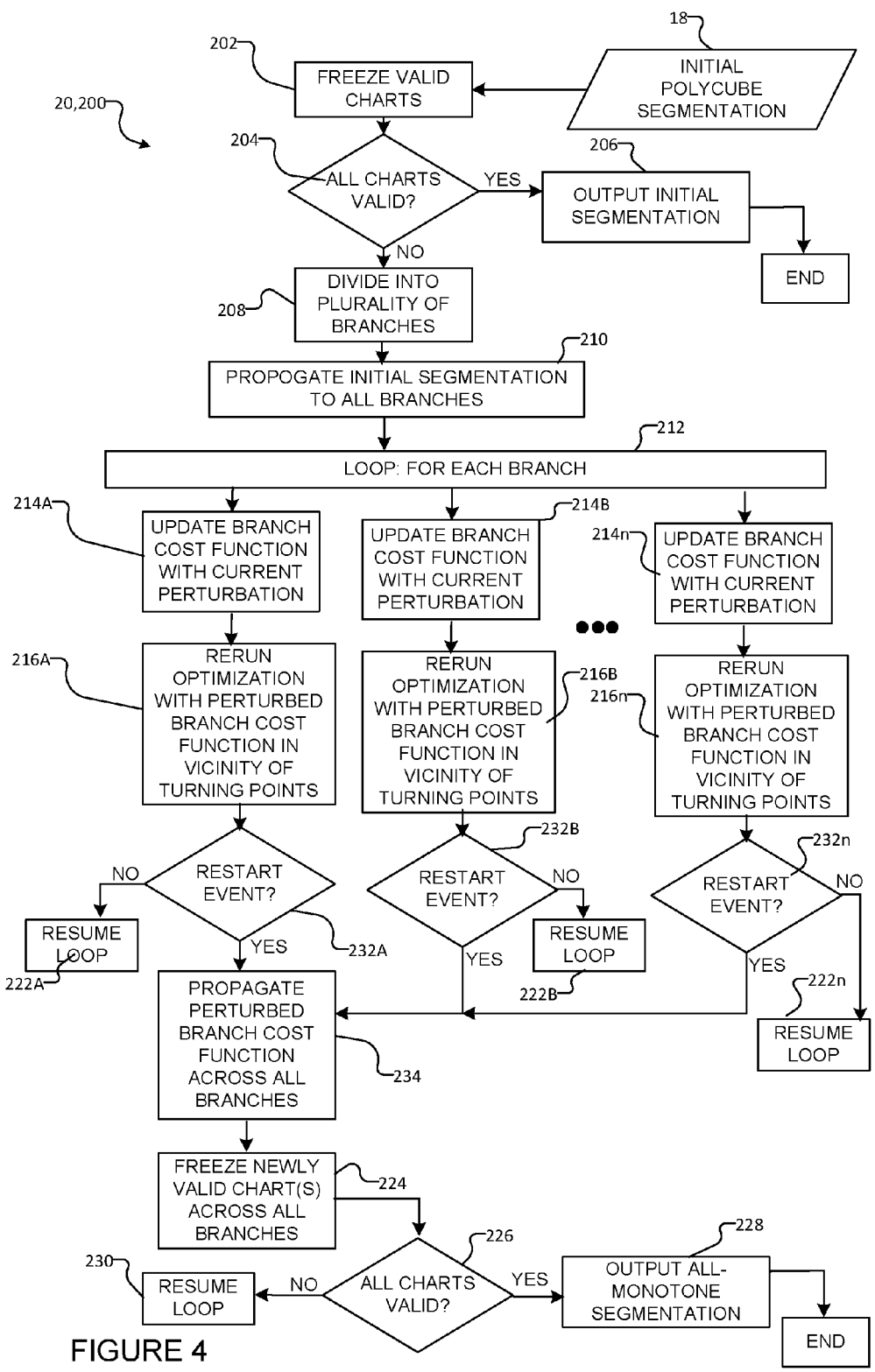
FIG. 4 is a schematic depiction of a computer-implemented method for generating an updated polycube segmentation, which may be used in the FIG. 2 methods according to another particular embodiment.

While the FIG. 3 method 100 is suitable for use in block 20 (FIG. 2) for most input models 14, method 100 may not be suitable for some input models 14, where it is desirable to have finer control over the perturbation applied in each iteration. An example of such a circumstance occurs where it is desirable to resolve a chart by applying one perturbation direction along one boundary and an opposite perturbation direction along another boundary of the same chart. FIG. 4 is a schematic depiction of a method 200 which may be used by a computer system to implement the procedures of block 20 according to another particular embodiment. While method 200 involves greater computational cost, method 200 permits more refined perturbation control and can therefore be used in circumstances where method 100 is not suitable or results in undesirably large distortion.

Many aspects of method 200 are similar to those described above for method 100. Functional blocks of method 200 which are similar to those of method 100 are described using similar reference numerals, which are preceded by the digit 2 (for method 200) and 1 (for method 100). In particular, blocks 202, 204, 206, 208, 210 and 212 of method 200 may be substantially similar to corresponding blocks 102, 104, 106, 108, 110 and 112 of method 100. Within each branch of the block 212 loop, the procedures of blocks 214A, 216A, 214B, 216B, . . . 214n, 216n may be substantially similar to the procedures of blocks 114A, 116A, 114B, 116B, . . . 114n, 116n.

Each branch of method 200 also includes an inquiry by the computer system in block 232A-232n into whether a "restart event" has occurred as a result of the block 216A-216n relabeling. In some embodiments, a restart event may comprise one or both of: detecting one or more newly monotonic charts (i.e. one or more charts that had one or more turning points in the branch segmentation of the previous iteration prior to the block 216A-216n optimization, but have become monotonic in the new branch segmentation after the block 216A-216n optimization); and/or detecting when a new chart is created by one of the block 216A-216n optimizations (e.g. by splitting a chart in the branch segmentation of the previous iteration into two or more charts in the new branch segmentation after the block 216A-216n optimization). In other embodiments, other additional or alternative restart criteria could be added to the inquiry of blocks 232A-232n. If the block 232A-232n inquiry is negative, then the computer system proceeds to a corresponding one of blocks 222A-222n in method 200, where the computer system returns to the block 212 loop in a manner similar to blocks 112A-122n of method 100.

If the block 232A-232n inquiry is positive (i.e. there has been a restart event), then the computer system proceeds to block 234 in method 200, which comprises: (i) propagating the perturbed branch cost function (and/or the perturbed branch fidelity costs) that resulted in the restart event to all of the other branches A, B, . . . n of method 200 as the block 234 propagated cost function (and/or the block 234 propagated fidelity costs); and (ii) restarting blocks 214A-214n and 216A-216n for all branches A, B, . . . n with the block 234 propagated cost function (and/or the block 234 propagated fidelity costs) as the initial (unperturbed) branch cost function (and/or branch fidelity costs). For example, if the computer system detects a restart event in block 232B (i.e. as a result of the relabeling performed in block 216B), then the perturbed branch cost function (and/or perturbed branch fidelity costs) propagated in block 234 will be the block 214B perturbed branch cost function (and/or block 214B perturbed branch fidelity costs). Once propagated, the block 214B perturbed branch cost function (and/or perturbed branch fidelity costs) are propagated in block 234, the block 214B perturbed branch cost function (and/or perturbed branch fidelity costs) will become the initial (unperturbed) cost function for each subsequent iteration of blocks 214A-214n and 216A-216n. So, to continue with this example, in the next iteration of block 214A, the initial (unperturbed) branch cost function (and/or unperturbed branch fidelity costs) used in block 214A will be the block 234 propagated cost function and the block 214A branch perturbation will be applied to the block 234 propagated cost function. Similarly, in the next iteration of block 216A, the block 234 propagated cost function will be used for the branch optimization in regions that are inside of non-monotone charts but outside of the vicinities of the turning points. It may be noted that propagating the perturbed branch cost function (and/or the perturbed branch fidelity costs) in block 234 will also effectively propagate the corresponding branch segmentation (absent frozen charts) of the branch A, B, . . . n which resulted in the restart event.

After propagating the perturbed branch cost function in block 234, the computer system proceeds to block 224 in method 200 where newly valid charts are frozen across all branches. As discussed above, one reason for a restart event in one of blocks 232A-232n is because of one or more newly monotonic charts in one of the new branch segmentations generated in block 216A-216n. Further, a restart event in one of blocks 232A-232n could have occurred because of the creation of one or more new charts, which themselves could be monotonic. If either of these events occurred, then there are one or more newly monotonic charts, which are frozen in block 224 and propagated to all branches of method 200. The freezing and propagation of such newly monotonic charts in block 224 may be substantially similar to that described above for block 124. It is the case, however, that block 224 could be reached where there are no newly monotonic charts. For example, if a new chart is created in one of the branch segmentations 216A-216n (resulting in a restart event in a corresponding one of blocks 232A-232n), but the newly created chart is itself non-monotonic, then there may be no new monotonic charts in block 224, in which case the computer system may take no action in block 224.

After block 224, the computer system proceeds to block 226 in method 200, which is substantially similar to block 126 and involves an inquiry as to whether all of the charts in any of the branch segmentations are monotonic. If the block 226 inquiry is positive (i.e. all charts are monotonic), the computer system outputs the all-monotonic segmentation in block 228 as updated (all-monotone) segmentation 22 (FIG. 2). If there are still turning points in the segmentation evaluated in block 226, the computer system proceeds to block 230 in method 200 which resumes the block 212 loop.

Like method 100 described above, where the branches of method 200 are executed by the computer system in parallel, it is possible that more than one restart event (e.g. more than one newly monotonic chart or more than one newly created chart) can be detected in blocks 232A-232n. In some embodiments, if such a situation occurs, then the block 234 propagated cost function (and/or propagated fidelity costs) may involve selecting and propagating the perturbed branch cost function (and/or branch fidelity costs) of one branch over the perturbed branch cost function(s) (and/or perturbed branch fidelity costs) of the other branch(es) either arbitrarily or in accordance with some suitable criteria. For example, the branch that results in the segmentation closest to initial polycube labeling 18 (FIG. 2) may be selected to have its perturbed cost function propagated in block 234.

Figure 4A:
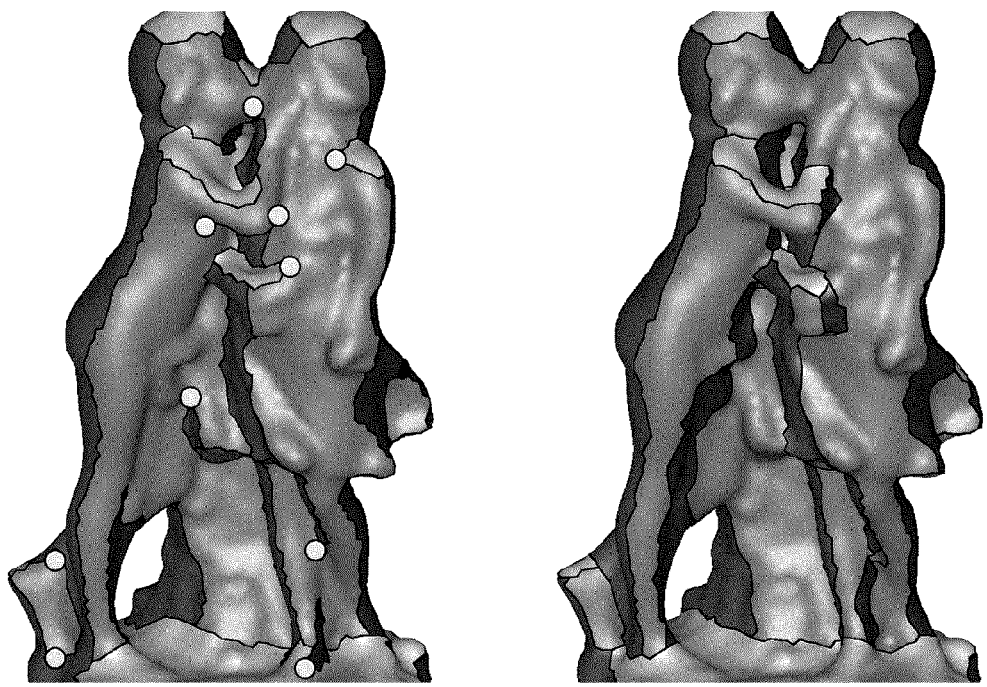
FIG. 4A is a graphical depiction of the application of the FIG. 4 method to an exemplary initial polycube labeling.

FIG. 4A is a graphical depiction of the application of the FIG. 4 method 200 by a computer system to an exemplary initial polycube labeling 18. FIG. 4A shows an initial polycube labeling 18 on the left hand side with the labels shown as different colors and the turning points shown as circles. The complex charts shown in initial polycube labeling 18 of FIG. 4A are better resolved by applying different perturbation directions to the same charts—a task that is better suited for method 200 than method 100. Applying method 200 to initial polycube labeling 18 yields updated (all-monotone) segmentation 22 shown at the right of FIG. 4A. The particular choice between method 100 and method 200 may be based on any suitable criteria, such as for example, available the computational resources of the computer system, known information about the complexity of input model 14 and/or the like. In some circumstances, it might be desirable to run method 100 unless it generates a segmentation that is unacceptable (e.g. updated polycube segmentation 22 generated by method 100 comprises fidelity that is unacceptably low or compactness that is unacceptably high). If the segmentation generated by method 100 is unacceptable, then method 200 may be employed.

Returning to FIG. 2, the output of a computer system performing method 10 is an updated segmentation 22 having all-monotone chart boundaries. Because of the computational optimization performed in blocks 16 and 20 (e.g. using a cost functions that have fidelity terms and compactness terms as described above), updated polycube segmentation 22 will comprise a balance between the competing objectives of fidelity and compactness. Further, because of the iterative hill-climbing approach used in block 20, updated polycube segmentation maintains the computationally optimum balance while relabeling triangles in initially non-monotonic charts to resolve non-monotonic chart boundaries with minimal perturbation. As discussed above, the computational optimizations performed in blocks 16 and 20 may also ensure that updated segmentation 22 meets at least two of the criteria for generating a valid polycube—i.e. that: no two charts updated polycube segmentation 22 which share a chart boundary will have opposing labels along the same axis and/or all chart corners in updated polycube segmentation 22 will have a valence of three. In the unlikely event that updated polycube segmentation 22 comprises a chart with less than four boundaries (i.e. violating the third criteria for a valid polycube segmentation), then method 10 may comprise an additional step (not shown) where the offending chart is deleted from updated polycube segmentation 22 and merged with one (or more) of its neighbors.

Updated polycube segmentation 22 is the output of a computer system performing method 10. Updated polycube segmentation 22 output from the computer system performing method 10 may be used, for example, to generate a polycube representation of input model 14, although this is not necessary. Updated polycube segmentation 22 output from the computer system performing method 10 may be used for other purposes, including (by way of non-limiting example) generating a multi-sweep representation of input model 14. FIG. 2 shows an optional method 10A, which uses updated polycube segmentation 22 to generate a polycube representation 26 (which may include a mapping between polycube representation 26 and input model 14) according to a particular embodiment. A computer system performing method 10A proceeds from block 20 to block 24, which involves extracting a polycube representation 26 using updated polycube segmentation 22 and input model 14. When a computer system implements method 10A, input model 14 may comprise a volumetric mesh of the input object (or a surface mesh from which a volumetric mesh is generated using one or more suitable techniques known in the art). As was the case with the discussion of method 10 above, it is assumed (without loss of generality) that input model 14 comprises a volumetric tet-mesh of the input object.

Figure 6:
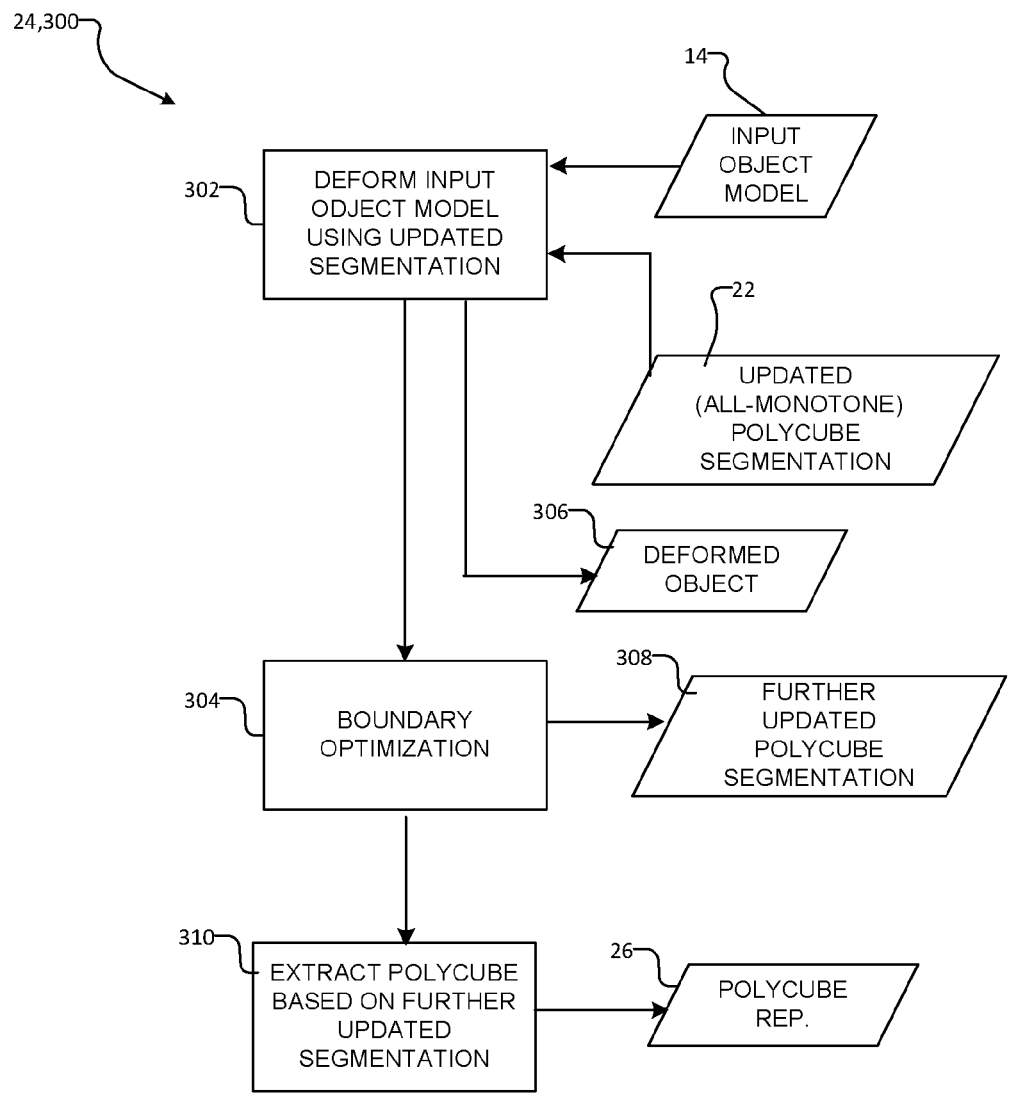
FIG. 6 is a schematic depiction of a computer-implemented method for extracting a polycube representation which may be used in the FIG. 2 method according to a particular embodiment.

FIG. 6 is a schematic depiction of a method 300 which may be performed by a computer system to implement the procedures of block 24 of method 10A according to a particular embodiment. Method 300 commences in block 302, in which the computer system takes input model 14 and updated (all-monotone) segmentation 22 as inputs and begins to deform the input model toward the desired polycube geometry. Given updated polycube segmentation 22 (e.g. as generated by method 10), the computer system may rotate the normal vectors of the surface triangles of input model 14 toward the normal vectors assigned by polycube segmentation 22 in block 302. The block 302 deformation process may be similar to the Gregson et al. technique described in U.S. patent application Ser. No. 13/948,016 filed 22 Jul. 2013, which is hereby incorporated herein by reference.

More particularly, the computer system may, in block 302, assign desired normal vectors to surface vertices of input model 14 based on polycube segmentation 22. Since any interior vertex in a chart has a one-ring consisting of triangles with the same labeling in polycube segmentation 22, the interior vertex has a known target orientation. The computer system may, in block 302, determine the minimum rotation that aligns the vertex normal vectors of each of these interior surface vertices in input model 14 with is target orientation as prescribed by polycube segmentation 22. Following the determination of these "anchor rotations" at the interior surface vertices, the computer system propagates these anchor rotations to the other vertices of input model 14 to define a volumetric rotation field in block 302. During this propagation, the anchor rotations are permitted to vary to balance the desirability of providing a low-distortion rotation field and the desirability of having surface triangles which have normal vectors aligned with their labels as prescribed by polycube segmentation 22. Balancing these competing objectives may be formulated as a computational optimization, as described in the Gregson et al. technique, and/or according to other techniques, such as (for example) an as-rigid-as-possible (ARAP) deformation.

Once this rotation field is determined, the computer system applies these rotations to determine new vertex positions in a deformed mesh in block 302, attempting to orient each edge in the deformed mesh with its new preferred direction while maintaining the length of the edge. Given an edge (i,j) with original vertex coordinates $\tilde{v}_i$ and $\tilde{v}_j$ and corresponding rotation matrices $\nabla_i$ and $\nabla_j$, the new vertex coordinates $v_i$, $v_j$ may be determined by minimizing:

$$\sum_{i,j} \left( (v_j - v_i) - \left( \frac{\nabla_i + \nabla_j}{2} \right) \cdot (\tilde{v}_i - \tilde{v}_j) \right)^2 \quad (4a)$$

over all mesh edges (i,j). This is referred to herein as a Poisson deformation.

Alternatively, or in addition, the computer system may apply an as-rigid-as-possible (ARAP) deformation or some other type of deformation that prefers purely rotational deformation over translational deformation (e.g. minimizes translational deformation). Given an edge (i,j) with original vertex coordinates $\tilde{v}_i$ and $\tilde{v}_j$ and a rotation matrix $\nabla_{ij}$ corresponding to the rotation of edge (i,j), the new vertex coordinates $v_i$, $v_j$ may be determined by minimizing:

$$\sum_{i,j} \omega_{ij} \| (v_j - v_i) - \nabla_{ij} (\tilde{v}_j - \tilde{v}_i) \| \quad (4b)$$

over all mesh edges (i,j). Weight factor $\omega_{ij}$ may be applied uniformly (e.g. $\omega_{ij}$ may equal 1 for all edges (i,j)) or non-uniformly (e.g. $\omega_{ij}$ may be based on the cotangent for each edge (i,j)).

Since the rotations of the surface vertices are permitted to vary from the rotations that would produce their target orientations, this computation of rotations and propagation of rotations may be referred to as a soft deformation and may be iteratively repeated a number of times in block 302. The output of the computer system at block 302 is a deformed model 306 corresponding input model 14 but which is deformed to have characteristics that are more similar to the desired polycube shape.

The computer system then proceeds to optional block 304 in method 300, which involves a number of procedures that attempt to optimize chart boundaries by improving their alignment. The block 304 boundary optimization procedures may involve: applying updated segmentation 22 to deformed model 306 output by the computer system at block 302 (if not already applied at block 302); and then iteratively applying a relabeling to small portions of the deformed model 306 while preserving the chart-level topology of updated segmentation 22. In some embodiments, this chart-level topology is preserved by permitting local edge and vertex positions to vary, while not allowing the creation of new charts, the removal of existing charts or charts that were not previously neighbors to become neighbors. The block 304 relabeling may be applied to two types of regions of deformed model 306: pairs of charts that share boundaries; and triplets of charts that share corners. In some embodiments, other types of regions may be considered for boundary optimization block 304.

To reduce the likelihood of chart-level topological changes when the block 304 relabeling is applied to a pair of charts that share a boundary, the labels on the triangles along the non-shared boundaries of the pair of charts may be fixed and the cost of assigning any label other than the ones corresponding to the pair of charts may be set to some effective infinity. To reduce the likelihood of topological changes when the computer system applies the block 304 relabeling to a triplet of charts that share a corner, the cost of assigning any label other than the labels of the three participating charts may be set to some effective infinity and the labels for triangles away from the corner may be fixed. For example, for a corner having three incident chart boundaries, the labels for triangles that are further (from the corner) than a fraction of the smallest incident chart boundary's length may be fixed. In some embodiments, this fraction may be ⅓, but may generally be a configurable parameter. While these constraints significantly reduce the likelihood of chart-level topological changes, they do not necessarily prevent them in all circumstances. If a block 304 relabeling results in a chart-level topological change, then block 304 may involve rolling back the relabeling result—i.e. leaving the boundary as is without implementing the relabeling.

The block 304 relabeling may involve the use of a cost function having the form of equation (1), except that it is applied to deformed model 306 output by the computer system at block 302 with the updated polycube segmentation 22 applied thereto. The fidelity term $F_s(s)$ of the block 304 cost function may have the form of equation (2). The compactness term used in block 304 may be updated to take into account how well a given triangle edge (on a chart boundary) is aligned with its target orientation. In particular embodiments, the compactness term used in block 304 may be given by:

If labels to be assigned to adjacent triangles p and q are the same:

$$C_{pq}(s_p, s_q) = 0 \quad (5a)$$

and

If labels to be assigned to adjacent triangles p and q are different:

$$C_{pq}(s_p, s_q) = 1 - e^{-\frac{1}{2}\left(\frac{\vec{e}_{pq} \cdot \vec{d} - 1}{\sigma}\right)^2} \quad (5b)$$

where: $\vec{d}$ is given by the axis direction closest to the vector from the starting vertex of the boundary in question to its end vertex (selected such that the triangle p is to the left of the boundary with respect to the path from the start to the end and the triangle q is to the right of the boundary using counterclockwise orientation with respect to the outward pointing normals along the boundary); and $\vec{e}_{pq}$ is a unit vector representing an edge direction between triangle p and triangle q which is oriented such that triangle p is to the left and triangle q is to the right; and $\sigma$ is a user-configurable term which is associated with the spread of the Gaussian function.

In some embodiments, the computer system may, when performing the block 304 boundary optimization, iteratively cycle more than once through pairs of charts that share boundaries and the triplets of charts that share corners in effort to perform re-labelings which optimize the boundaries without changing the chart-level topology prescribed by updated polycube segmentation 22. The number of iterations performed in block 304 may be determined heuristically. For example, the number of block 304 iterations may be user configurable or block 304 may be configured to iterate for a user-configurable period of time or block 304 may be configured to iterate until the changes between iterations are below some suitable threshold.

The output of the computer system at block 304 is a further updated segmentation 308 of deformed input model 306, where the boundaries of further updated segmentation 308 have been optimized in accordance with the procedures of block 304. In some embodiments, block 304 is not necessary and further updated segmentation 308 may comprise the block 302 deformed object with the updated polycube segmentation 22 applied thereto.

The computer system then proceeds to block 310 in method 300, which comprises extracting polycube representation 26 from further updated segmentation 308. The computer system may generate a parameterization between input model 14 and polycube representation 26 at block 310. Extracting the polycube geometry from further updated segmentation 308 may involve using a deformation process similar to that of 302 described above. The computer system may further repeat the iterative process of block 302 at block 310 with planarity constraints added to equation (4a) or (4b) to minimize, for every surface edge, the difference between its end point values along the relevant axis. These constraints may be effected by relatively heavily weighting equation (4a) or (4b) to conform the surface vertices to their polycube geometries. As with block 302 described above, the computer system may, at block 310, use gradual deformation with soft constraints/weights that minimize distortion while further deforming further updated segmentation 308 towards its final polycube shape. Once this process converges, the computer system may, at block 310, compute a final polycube geometry by forcing the vertices in each chart to have the same coordinate value along their relevant axes.

In some circumstances or embodiments, the block 302 deformations may cause opposing charts to reverse order. That is, for two edges (i,j) and (k,l) along interiors or boundaries of a first chart labelled with one direction along an axis and a second chart labelled with an opposing direction along the same axis, respectively, may have a particular order along an axis. Without loss of generality, suppose the charts in question are labelled with +X and −X, respectively, and are ordered so that (i,j) precedes (k,l) along the X-axis. After deformation, (i,j) and (k,l) correspond to post-deformation edges (i',j') and (k',l'), respectively. If (k', l') precedes (i', j') along the X-axis, those edges are said to have reversed order (or "flipped"). Reversing order is generally undesirable, as it may cause self-intersection of faces of deformed model 306, potentially resulting in an invalid polycube. The computer system may maintain a record of chart orientations and orders and check for reversals after deformations (e.g. after deformation in block 302). If a reversal is detected, then the computer system may increase the weighting of Equations (4a) or (4b) and re-run the block 302 deformation to reduce distortion of one or both of the reversed edges.

This block 310 deformation results in a polycube 28 having corner vertices in their correct positions; however, the positions computed for the rest of the vertices are not guaranteed to be on polycube 28 defined by these corners. Accordingly, the computer system may compute a parameterization between input model 14 and polycube representation 28 at block 310. Computing a low-distortion parameterization from input mesh 14 to polycube 28 may comprise parameterizing each chart into a fixed, possibly concave, planar polygon which is a well-known open problem in mesh processing. In some embodiments, this challenge is sidestepped at block 310 by first computing a bijective (but possibly poor quality) map from input model 14 to polycube 28 and then improving this mapping by operating from polycube 28 to input model 14 (i.e. in the opposite direction).

In some embodiments, the computer system generates the initial polycube map by first mapping each chart boundary to its corresponding polycube edge using arc-length parameterization at block 310. Thereafter, the computer system may, at block 310, use the method described in Xu et al. 2011 (XU, Y., CHEN, R., GOTSMAN, C., AND LIU, L. 2011. Embedding a triangular graph within a given boundary. Computer Aided Geometric Design 28, 6, 349-356.) with mean value coordinates to position the interior chart vertices. If a volumetric parameterization is desired in block 310, then the above-described deformation framework may be used, keeping surface vertex positions fixed and specifying surface rotations using a coordinate frame given by the new normal and one of the edges. For applications such as seamless texturing or meshing, it is desirable that the corners of the polycube be placed at vertices of a fixed size grid. To perform such quantization, some embodiments of the computer system may place corner vertices in the quantized locations and then relocate the polycube surface vertices using mean-value coordinates at block 310, as described by Hormann and Floater 2006 (HORMAN, K. AND FLOATER, M. S. 2006. Coordinates for Arbitrary Planar Polygons. ACM Transactions on Graphics, 25(4), 1424-1441), with respect to the corners of its corresponding polycube face. In some embodiments, the computer system may similarly relocate interior vertices using the surface mesh as a cage for 3D mean-value coordinates in accordance with the technique of Ju et al. 2005 (JU, T., SCHAEFER, S., AND WARREN, J. 2005. Mean value coordinates for closed triangular meshes. SIGGRAPH, 561-566.) at block 310.

At the conclusion of this process, a computer system performing method 10A has two models (input model 14 and polycube 26) and a basic mapping between them. In some embodiments, it may be desirably to further process the mapping between input model 14 and polycube 26, which minimizes (or at least reduces) cross-parameterization distortion. There are a large number of known techniques for reducing such cross-parameterization distortion. In some embodiments, determining a low distortion polycube to input map in block 310 may comprise re-meshing polycube 28 using known techniques, such as those disclosed by the Alice Project-team (ALICE PROJECT-TEAM. Graphite. http://alice.loria.fr/software/graphite/) and using the block 310 mapping to project the polycube 28 mesh to input model 14. In some embodiments, block 310 may then involve sliding the projected vertices along the input model surface in order to minimize the mapping distortion between the two meshes, measured using mean-value coordinates (T. Popa, I. South-Dickinson, A. Sheffer, D. Bradley, W. Heidrich, Globally Consistent Space-Time Reconstruction, *Computer Graphics Forum* (Proc. SGP), 2010.). It may be noted that once the polycube 28 and the initial map are known, there are multiple methods for improving the parameterization. For example, a quad mesh can be similarly generated and slid on the surface of the input model. While the above-described technique is effective, it is included for explanatory reasons only and other techniques may be used in other embodiments.

In some embodiments, polycube 28 generated by a computer system performing method 10A (FIG. 2) may be used to generate a tetrahedral mesh, which may be mapped to project a new (tetrahedral) mesh onto input object 14. Examples of techniques which may be used to generate such tet-meshes and corresponding mappings are described in U.S. patent application Ser. No. 13/948,016 filed 22 Jul. 2013 and by GREGSON, J., SHEFFER, A., AND ZHANG, E. 2011. All-hex mesh generation via volumetric polycube deformation. Computer Graphics Forum (Proc. SGP) 30, 5, both of which are hereby incorporated by reference.

Figure 7A:
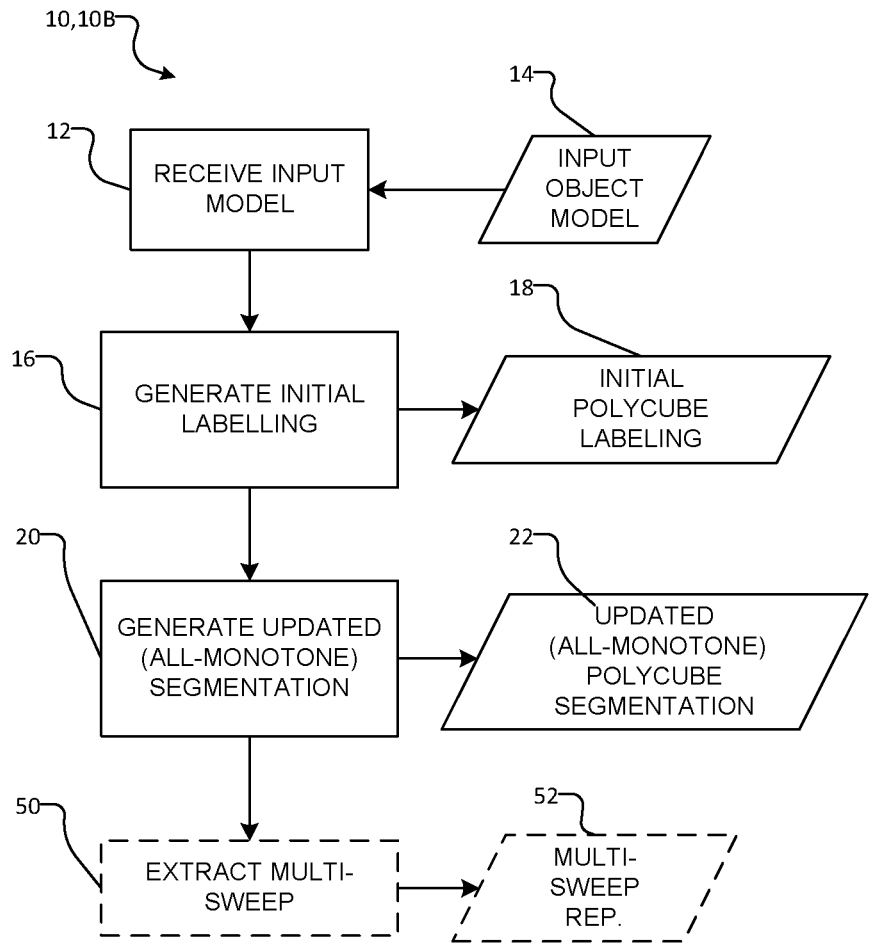
FIG. 7A is a schematic representation of a computer-implemented method for generating an all-monotone polycube segmentation of an input object model according to a particular embodiment of the invention and an optional method for using the polycube segmentation to generate a three-dimensional multi-sweep representation of the input object.

As discussed above, all-monotone polycube segmentation 22 generated by a computer system performing method 10 (FIG. 2) is not limited to being used to generate polycubes. FIG. 7A shows a method 10B for generating a multi-sweep representation 52 based on input model 14. Method 10B comprises method 10 (as described above) for generating all-monotone polycube segmentation 22 and then using all-monotone polycube segmentation 22 for extracting multi-sweep representation 52 in block 50.

Figure 7B:
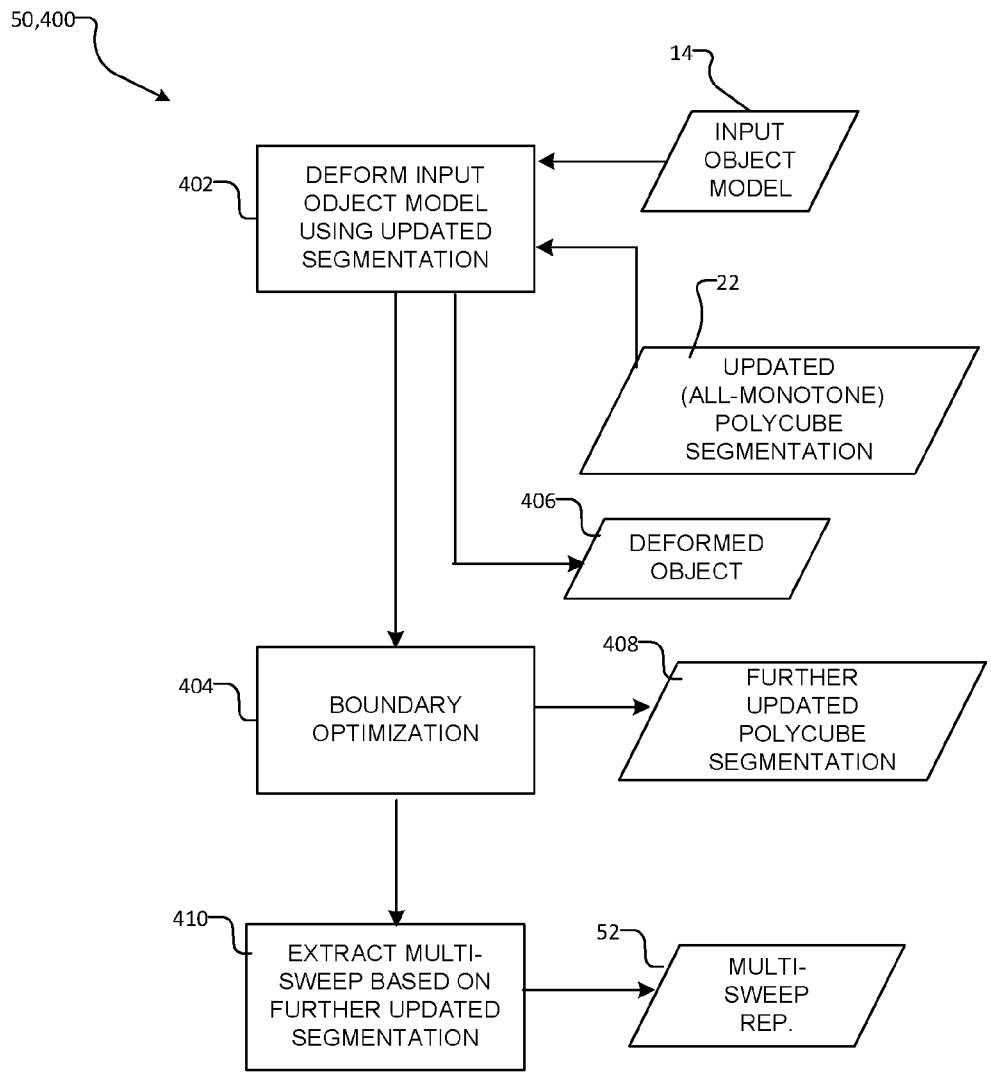
FIG. 7B is a schematic depiction of a computer-implemented method for extracting a multi-sweep representation which may be used in the FIG. 7A method according to a particular embodiment.

FIG. 7B is a schematic depiction of a method 400 for extracting a multi-sweep representation 52 which may be used by a computer system to implement the procedures of block 50 according to a particular embodiment. In one particular embodiment, block 402 and optional block 404 are substantially similar to blocks 302 and 304 of method 300 described above. Then, in block 410, rather than continuing to deform the deformed object 406 to conform with a polycube geometry, the computer system begins to deform deformed object 406 into a multi-sweep geometry. For this purpose, the computer system may select of one of the Cartesian axes (X,Y,X) to be the sweep axis in block 410. In some embodiments, the particular axis chosen to be the block 410 sweep axis may be selected by a user or may be pre-selected. In some embodiments, the procedures of method 400 may be performed by the computer system for each of the three Cartesian axes to generate three corresponding multi-sweep representations 52. In some embodiments, input model 14 may be divided into a plurality of portions and a corresponding sweep axis may be chosen for each portion of input model 14.

Once a sweep axis is selected, then the computer system determines, at block 410, the minimum rotation that aligns the vertex normal vectors of the interior surface vertices in deformed object 406 with charts labeled (as prescribed by further updated polycube segmentation 408) along the sweep axis with the sweep axis. For example, if the sweep axis is the X-axis, then the computer system determines the minimum rotations that would align the vertex normal vectors of the interior surface vertices of the +X and −X labeled charts (from the labels prescribed by further updated polycube segmentation 408) with the X-axis at block 410. For the interior surface vertices corresponding to non-principal axes, rotations may be determined such that the normal vectors of these non-sweep axis vertices are orthogonal to the sweep axis, but are not strictly required to align with their corresponding axis. For example, if the X-axis is the sweep axis, then the computer system determines rotations that would align the vertex normal vectors of the interior surface vertices of the +Y, −Y, +Z and −Z labeled charts (from the labels of further updated polycube segmentation 408) to be orthogonal to the X-axis without strictly requiring these rotations to be aligned with their corresponding label axes. These rotations of the interior surface vertices may be referred to as "anchor rotations".

Following the determination these anchor rotations at the interior surface vertices, the computer system propagates these anchor rotations to the other vertices of deformed object 406 to define a volumetric rotation field at block 410. During this propagation, the anchor rotations are permitted to vary to balance the desirability of providing a low-distortion rotation field and the desirability of having surface triangles with normal vectors, which, for the sweep axis, are aligned with their labels; and, for the non-principal axes, satisfy their orthogonality criteria. Balancing these competing objectives may be formulated as a computational optimization in a manner similar to that of the Gregson et al. technique.

Once this rotation field is determined, the computer system applies these rotations to determine new vertex positions in a deformed mesh at block 410, attempting to orient each edge in the deformed mesh with its new preferred direction while maintaining the length of the edge. Given an edge (i,j) with original vertex coordinates $\tilde{v}_i$ and $\tilde{v}_j$ and corresponding rotation matrices $\nabla_i$ and $\nabla_j$, the new vertex coordinates $v_i$, $v_j$ can be determined by minimizing:

$$\sum_{i,j}\left((v_j - v_i) - \left(\frac{\nabla_i + \nabla_j}{2}\right)\cdot(\tilde{v}_i - \tilde{v}_j)\right)^2 \quad (4)$$

over all mesh edges (i,j). Since the rotations of the surface vertices are permitted to vary from the rotations that would produce their target orientations, this computation of rotations and propagation of rotations may be referred to as a soft deformation and may be iteratively repeated by the computer system a number of times in block 410. In successive iterations of this deformation, block 410 may involve increasing weighting (e.g. in equation (4)) the need to conform with the multi-sweep constraints—i.e. to have surface triangles with labels along the sweep axis to have normal vectors which are aligned with the sweep axis and for other surface triangles to have normal vectors that are orthogonal to the sweep axis. In a final iteration of block 410, these multi-sweep constraints/weights may be rigidly applied to provide a multi-sweep representation 52 that conforms with the desired multi-sweep geometry. Generating a mapping which minimizes cross-parameterization distortion may then be accomplished using any of a wide variety of suitable techniques, including, for example, any of the techniques described above in the polycube context.

In another multi-sweep extraction embodiment, the computer system may, at block 402 (in a manner similar to block 410 described above), use updated polycube segmentation 22 to cause deformation that begins to deform input model 14 into a deformed object 406 which looks more like a multi-sweep representation (rather than a polycube representation, as would be the case if block 402 was identical to block 302). Like block 410 described above, the anchor rotations for such a deformation would be based on the minimum rotation that aligns the vertex normal vectors of the interior surface vertices in input model with charts labeled (as prescribed by updated polycube segmentation 22) along the sweep axis with the sweep axis. For example, if the sweep axis is the X-axis, then the computer system may, at block 402, determine the minimum rotations that would align the vertex normal vectors of the interior surface vertices of the +X and −X labeled charts (from the labels prescribed by updated polycube segmentation 22) with the X-axis. For the interior surface vertices corresponding to non-principal axes, rotations may be determined such that the normal vectors of these non-sweep axis vertices are orthogonal to the sweep axis, but are not strictly required to align with their corresponding axis. For example, if the X-axis is the sweep axis, then the computer system may, at block 402, involve determining rotations that would align the vertex normal vectors of the interior surface vertices of the +Y, −Y, +Z and −Z labeled charts (from the labels of updated polycube segmentation 22) to be orthogonal to the X-axis without strictly requiring these rotations to be aligned with their corresponding label axes. In other respects, block 402 would be similar to block 302 described above. Block 404 may also differ from block 304 of the previously discussed environment, as block 404 may involve boundary optimization in accordance with the multi-sweep criteria. In some embodiments, block 404 may only involve boundary optimization for boundaries surrounding charts aligned with the sweep axis and any corners along this boundary.

Figure 5:
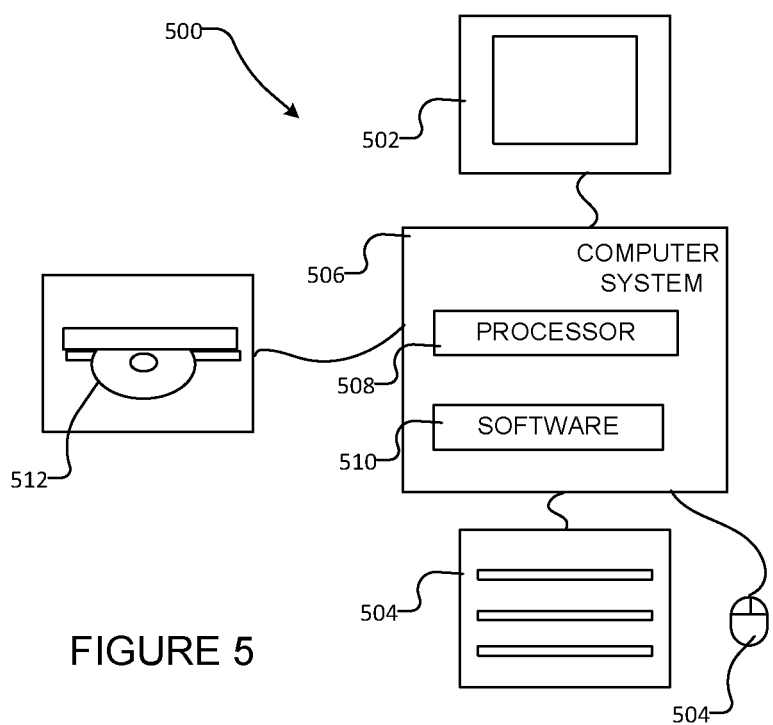
FIG. 5 is a schematic representation of a system according to a particular embodiment which may be used to implement a number of the methods described herein.

FIG. 5 shows a schematic diagram of a system 500 which may be configured to implement all or part of any of the methods described herein according to an example embodiment. System 500 comprises a display 502, user input devices 504 and a computer system 506 comprising a processor 508. Processor 508 may have access to software 510, which may be used to configure processor 508 to perfume all or part of any of the methods described herein. In some embodiments, processor 508 may be configured to perform all or part of any of the methods described herein using a combination of hardware and software 510. In some embodiments, processor 510 may have access to computer-readable medium 512 which may comprise suitable codified instructions which, when executed by processor 510, cause processor 510 to perform any all or part of the methods described herein.

Computer system 506, processor 510 and components thereof may comprise hardware, software, firmware or any combination thereof. Processor 510 may comprise one or more microprocessors, digital signal processors, graphics processors, field programmable gate arrays, and/or the like. Components of system 500 may be combined or subdivided, and components of system 500 may comprise sub-components shared with other components of system 500. Components of system 500 may be physically remote from one another. For example, processor 510 may be instantiated in a programmed server computer, which communicates with display 502 via the internet or another network.

Where a component is referred to above (e.g., a system, display, processor, etc.), unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Unless the context clearly requires otherwise, throughout the description and any included claims and/or aspects, the words "comprise," "comprising," and the like are to be construed in an inclusive sense, as opposed to an exclusive or exhaustive sense; that is to say, in the sense of "including, but not limited to." Where the context permits, words in the above description using the singular or plural number may also include the plural or singular number respectively. The word "or," in reference to a list of two or more items, covers all of the following interpretations of the word: any of the items in the list, all of the items in the list, and any combination of the items in the list.

The above detailed description of example embodiments is not intended to be exhaustive or to limit this disclosure or any include aspects and/or claims to the precise forms disclosed above. While specific examples of, and examples for, embodiments are described above for illustrative purposes, various equivalent modifications are possible within the scope of the technology, as those skilled in the relevant art will recognize.

These and other changes can be made to the system in light of the above description. While the above description describes certain examples of the technology, and describes the best mode contemplated, no matter how detailed the above appears in text, the technology can be practiced in many ways. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims and/or aspects should not be construed to limit the system to the specific examples disclosed in the specification, unless the above description section explicitly and restrictively defines such terms. Accordingly, the actual scope of the technology encompasses not only the disclosed examples, but also all equivalent ways of practicing or implementing the technology under the claims and/or aspects.

While a number of exemplary aspects and embodiments are discussed herein, those of skill in the art will recognize certain modifications, permutations, additions and sub-combinations thereof. By way of non-limiting example:

The order of many of the blocks illustrated in methods 100 and 200 may be altered. For example, in method 100, the order of blocks 124 and 126 could be interchanged. Similarly, in method 200, block 226 could be performed before blocks 234 and 236.

In some embodiments, any of a wide variety of cross-parameterization techniques could be used in blocks 310, 410 of methods 300, 400.

In some embodiments, different cost functions and/or (fidelity and/or compactness) cost terms could be used. By way of non-limiting example, weightings could be applied to particular triangles (e.g. based on triangle size) and/or to particular triangle edges (e.g. based on edge length) and/or to particular boundaries (e.g. based on boundary length).

The above discussed iterative soft deformation (e.g. used in blocks 302, 310, 402 and 410) is not necessary. In some embodiments, a single rigid deformation could be used to implement any of these deformations.

What is claimed is:

1. A method for generating a polycube segmentation of an input object originally provided in an input mesh representation, the method comprising:
   providing, at a processor, an input mesh representation of the input object comprising a plurality of surface faces representing a surface of the input object;
   generating, by the processor, an initial polycube labeling for the surface faces, wherein generating the initial polycube labeling comprises:
   assigning, to each surface face, a label which is one of six directions ($\pm X, \pm Y, \pm Z$) aligned with a set of Cartesian axes,
   generating, by the processor, a plurality of charts based on the labels assigned to each surface face, each chart comprising a contiguous patch of one or more surface faces being assigned the same label, and
   effecting, by the processor, a tradeoff between competing objectives of: making the initial polycube labeling compact; and making the initial polycube labeling faithful to a surface geometry of the input object; and
   generating, by the processor, an updated polycube segmentation, wherein generating the updated polycube segmentation comprises changing the label assigned to each of one or more surface faces and thereby modifying one or more of the charts to provide the charts with monotonic boundaries;
   wherein effecting the tradeoff between the competing objectives comprises performing, by the processor, an initial computational optimization which comprises using an initial cost function and wherein the initial cost function assigns a cost based at least in part on a compactness metric representative of compactness of the initial polycube labeling and assigns a cost based at least in part on a fidelity metric representative of faithfulness of the initial polycube labeling to the surface geometry of the input object.

2. A method according to claim 1 wherein the initial cost function comprises: a compactness term which assigns cost based at least in part on the compactness metric; and an initial fidelity term which assigns cost based at least in part on the fidelity metric.

3. A method according to claim 1 wherein the compactness metric is based, at least in part, on one or more of: a number of charts in the initial polycube labeling; a number of chart corners in the initial polycube labeling; and lengths of chart boundaries in the initial polycube labeling.

4. A method according to claim 1 wherein the compactness metric prescribes relatively high cost when the labels associated with the charts of the initial labeling change relatively frequently and relatively low cost when the labels associated with the charts of the initial labeling are relatively constant.

5. A method according to claim 1 wherein the compactness metric $C_{pq}(s_p, s_q)$, for a pair of adjacent surface faces p and q of the initial polycube labeling having the labels $s_p$ and $s_q$, has the form:
   If labels $s_p$ and $s_q$ are the same: $C_{pq}(s_p, s_q)=0$; and
   If labels $s_p$ and $s_q$ are different: $C_{pq}(s_p, s_q)=e^{-1/2(\vec{n}_p \cdot \vec{n}_q - 1/\sigma)^2}$ where $\vec{n}_p$ and $\vec{n}_q$ are the normal vectors of the adjacent surface faces p and q and $\sigma$ is a configurable parameter.

6. A method according to claim 1 wherein the compactness metric $C_{pq}(s_p, s_q)$, for a pair of adjacent surface faces p and q of the initial polycube labeling having the labels $s_p$ and $s_q$, has the form:
   If labels $s_p$ and $s_q$ are the same: $C_{pq}(s_p, s_q)=0$; and
   If labels $s_p$ and $s_q$ are different: $C_{pq}(s_p, s_q)=1$.

7. A method according to claim 1 wherein the fidelity metric is based at least in part on dihedral angles between normal vectors of the surface faces and corresponding labels assigned to the surface faces in the initial polycube labeling.

8. A method according to claim 1 wherein the fidelity metric prescribes relatively high cost when the angles between normal vector of the surface faces and the label assigned to the surface faces in the initial polycube labeling are relatively high and prescribes relatively low cost when the angles between the normal vector of the surface faces and the labels assigned to the surface faces in the initial polycube labeling are relatively low.

9. A method according to claim 1 wherein the fidelity metric $F_t(s)$ for a particular surface face t having the assigned label s in the initial polycube labeling is given by:

$$F_t(s)=1-e^{-1/2(\vec{n}_t \cdot \vec{s} - 1/\sigma)^2}$$

where $\vec{n}_t$ is the normal vector of the surface face, $\vec{s}$ is the direction of the assigned label and $\sigma$ is a configurable parameter.

10. A method according to claim 1 wherein generating the updated polycube segmentation comprises:
    locating one or more turning points on boundaries of one or more charts in the initial polycube labeling and determining the one or more charts with one or more turning points on their boundaries to be non-monotonic charts; and updating the labels assigned to the surface faces in the one or more non-monotonic charts, wherein updating the labels assigned to the surface faces in the one or more non-monotonic charts comprises performing a perturbed computational optimization using a perturbed cost function which is different than the initial cost function to assign updated labels to surface faces in the one or more non-monotonic charts.

11. A method according to claim 10 wherein each turning point on a chart boundary represents a location where the chart boundary changes direction with respect to an axis along which the chart boundary ought to be oriented in accordance with the labels assigned to the charts on either side of the boundary.

12. A method according to claim 10 wherein the perturbed cost function is perturbed, relative to the initial cost function, in local vicinities of any turning points and is not perturbed outside of the local vicinities of any turning points.

13. A method according to claim 12 wherein the perturbation of the perturbed cost function in the local vicinities of any turning points prescribes relatively higher cost to assigning at least one of labels ($\pm X, \pm Y, \pm Z$) to the surface faces in the local vicinities of any turning points, when compared to previously determined costs for these surface faces.

14. A method according to claim 12 wherein the perturbation of the perturbed cost function in the local vicinities of any turning points prescribes relatively higher cost to assigning either of a pair of axially aligned labels to the surface faces in the local vicinities of any turning points, when compared to previously determined costs for these surface faces.

15. A method according to claim 12 wherein the perturbation of the perturbed cost function in the local vicinities of any turning points prescribes relatively lower cost to assigning at least one of labels ($\pm X, \pm Y, \pm Z$) to the surface faces in the local vicinities of any turning points, when compared to previously determined costs for these surface faces.

16. A method according to claim 12 wherein the perturbation of the perturbed cost function in the local vicinities of any turning points prescribes relatively lower cost to assigning a pair of axially aligned labels to the surface faces in the local vicinities of any turning points, when compared to previously determined costs for these surface faces.

17. A method according to claim 10 wherein generating the updated polycube segmentation comprises iteratively repeating:
locating one or more turning points on boundaries of one or more non-monotonic charts and determining the one or more charts with one or more turning points on their boundaries to be non-monotonic charts; and
updating the labels assigned to the surface faces in the one or more non-monotonic charts, wherein updating the labels assigned to the surface faces in the one or more non-monotonic charts comprises performing a perturbed computational optimization using a perturbed cost function which is different than the initial cost function to assign updated labels to surface faces in the one or more non-monotonic charts;
until no further turning points can be located.

18. A method according to claim 10 wherein updating the labels assigned to the surface faces in the one or more non-monotonic charts comprises:
providing a plurality of branches, with each branch comprising a corresponding perturbed branch cost function which is perturbed relative to the initial cost function, the corresponding perturbed branch cost function different for each of the branches;
for each branch, performing a perturbed computational optimization using the corresponding perturbed branch cost function to assign updated labels to surface faces in the one or more non-monotonic charts.

19. A method according to claim 18 wherein, for each branch, performing the perturbed computational optimization using the corresponding perturbed branch cost function comprises: generating a corresponding branch segmentation; and propagating any newly monotonic charts in the corresponding branch segmentation across all of the branches.

20. A method according to claim 10 wherein generating the updated polycube segmentation comprises:
providing a plurality of branches, with each branch comprising a corresponding perturbed branch cost function which is perturbed relative to the initial cost function, the corresponding perturbed branch cost function different for each of the branches;
initializing a branch segmentation for each branch to be the initial polycube labeling;
cycling through the branches and, for each branch:
locating one or more branch turning points on boundaries of one or more charts in the branch segmentation and determining the one or more charts with one or more turning points on their boundaries to be non-monotonic charts within the branch segmentation; and
updating the labels assigned to the surface faces in the one or more non-monotonic charts within the branch segmentation, wherein updating the labels assigned to the surface faces in the one or more non-monotonic charts within the branch segmentation comprises performing a perturbed branch computational optimization using the corresponding perturbed branch cost function to assign updated labels to surface faces in the one or more non-monotonic charts within the branch segmentation to thereby obtain an updated branch segmentation; and
propagating any newly monotonic charts in the updated branch segmentation across all of the branches.

21. A method according to claim 20 comprising iteratively repeating cycling through the branches, wherein at the conclusion of each iteration the updated branch segmentation for each branch is assigned to be the branch segmentation for the next iteration of the branch.

22. A method according to claim 20 comprising iteratively repeating cycling through the branches, wherein at the conclusion of each iteration, the perturbed branch cost function for each branch is assigned to be the unperturbed branch cost function for the next iteration of the branch.

23. A method according to claim 20 comprising iteratively repeating cycling through the branches, wherein at the conclusion of each iteration, perturbed branch fidelity costs for each branch are assigned to be the unperturbed branch fidelity costs for the next iteration of the branch.

24. A method according to claim 21 comprising iteratively repeating cycling through the branches until all of the charts in an updated branch segmentation are monotonic.

25. A method according to claim 18 wherein, for each branch, the corresponding perturbed branch cost function is perturbed, relative to the initial cost function, in local vicinities of any turning points in the branch segmentation and is not perturbed outside of the local vicinities of any turning points.

26. A method according to claim 25 wherein, for at least one branch from among the plurality of branches, the perturbation of the perturbed branch cost function in the local vicinities of any turning points in the branch segmentation prescribes relatively higher cost to assigning at least one of labels (±X,±Y,±Z) to the surface faces in the local vicinities of any turning points in the branch segmentation, when compared to previously determined costs for these surface faces in the at least one branch.

27. A method according to claim 26 wherein, for at least one different branch from among the plurality of branches, the perturbation of the perturbed branch cost function in the local vicinities of any turning points in the branch segmentation prescribes relatively higher cost to assigning at least one different one of the labels (±X,±Y,±Z) to the surface faces in the local vicinities of any turning points in the branch segmentation, when compared to previously determined costs for these surface faces in the at least one different branch.

28. A method according to claim 25, wherein, for at least one branch from among the plurality of branches, the perturbation of the perturbed branch cost function in the local vicinities of any turning points in the branch segmentation prescribes relatively higher cost to assigning either of a pair of axially aligned labels to the surface faces in the local vicinities of any turning points in the branch segmentation, when compared to previously determined costs for these surface faces in the at least one branch.

29. A method according to claim 25, wherein, for at least one branch from among the plurality of branches, the perturbation of the perturbed branch cost function in the local vicinities of any turning points in the branch segmentation prescribes relatively lower cost to assigning at least one of labels (±X,±Y,±Z) to the surface faces in the local vicinities of any turning points in the branch segmentation, when compared to previously determined costs for these surface faces in the at least one branch.

30. A method according to claim 29 wherein, for at least one different branch from among the plurality of branches, the perturbation of the perturbed branch cost function in the local vicinities of any turning points in the branch segmentation prescribes relatively lower cost to assigning at least one different one of the labels (±X,±Y,±Z) to the surface faces in the local vicinities of any turning points in the branch segmentation, when compared to previously determined costs for these surface faces in the at least one different branch.

31. A method according to claim 25, wherein, for at least one branch from among the plurality of branches, the perturbation of the perturbed branch cost function in the local vicinities of any turning points in the branch segmentation prescribes relatively lower cost to assigning either of a pair of axially aligned labels to the surface faces in the local vicinities of any turning points in the branch segmentation, when compared to previously determined costs for these surface faces in the at least one branch.

32. A method according to claim 18, wherein, for each branch from among the plurality of branches, the corresponding perturbed branch cost function makes it more or less attractive to assign or more corresponding updated branch labels in comparison to the corresponding perturbed branch cost functions of other ones of the plurality of branches.

33. A method according to claim 20, wherein propagating any newly monotonic charts in the updated branch segmentation across all of the branches comprises freezing the updated labels for the newly monotonic charts in all branches such that the newly monotonic charts are no longer subject to having their labels updated.

34. A method according to claim 21 wherein cycling through the branches comprises, when the updated branch segmentation of a particular branch comprises a newly monotonic chart or when the branch segmentation of the particular chart results in the creation of a new chart, propagating the perturbed branch cost function for the particular branch to all of the branches to become an unperturbed branch cost function for each branch, determining new perturbed branch cost functions for each chart on the basis of the new unperturbed branch cost function and restarting cycling through the branches.

35. A method according to claim 21 wherein cycling through the branches comprises, when the updated branch segmentation of a particular branch comprises one or more newly monotonic charts or when the branch segmentation of the particular chart results in the creation of one or more new charts, propagating the perturbed branch fidelity costs for the particular branch to all of the branches to become the unperturbed branch fidelity costs for each branch, determining new perturbed branch fidelity costs for each surface face on the basis of the new unperturbed branch fidelity costs and restarting cycling through the branches.

36. A method according to claim 1 comprising extracting a polycube representation of the input object based at least in part on the input mesh representation of the input object and the updated polycube segmentation.

37. A method according to claim 36 wherein extracting the polycube representation of the input object comprises:
   determining a desired polycube geometry based at least in part on the updated polycube segmentation and the input object; and
   iteratively deforming the input object toward the desired polycube geometry while computationally optimizing, by the processor, a cost function which balances obtaining the desired polycube geometry and providing low distortion deformations in each iteration.

38. A method according to claim 37 wherein extracting the polycube representation comprises, after one or more iterations of deforming the input object toward the desired polycube geometry, applying the updated polycube segmentation to the deformed input object and performing one or more relabelings of the surface faces of the deformed input object, without changing the chart-level topology of the deformed input object, the one or more relabelings taking place at one or more of: pairs of charts on the deformed input object that share boundaries; and triplets of charts on the deformed input object that share corners, and wherein the relabelings provide a further updated polycube segmentation which attempts to optimize the boundaries of the deformed object for further deformation into strict adherence with polycube geometry.

39. A method according to claim 38 wherein extracting the polycube representation comprises:
   determining a further desired polycube geometry based at least in part on the further updated polycube segmentation and the deformed input object; and
   iteratively deforming the deformed input object toward the further desired polycube geometry while computationally optimizing, by the processor, a cost function which balances obtaining the further desired polycube geometry and providing low distortion deformations in each iteration.

40. A method according to claim 39 wherein extracting the polycube representation comprises performing a final deformation of the deformed input object which forces the deformed input object to strictly conform to the further desired polycube geometry.

41. A method according to claim 37 wherein extracting the polycube representation comprises performing a final deformation of the deformed input object which forces the deformed input object to strictly conform to the desired polycube geometry.

42. A method according to claim 1 comprising extracting a multi-sweep representation of the input object based at least in part on the input mesh representation of the input object and the updated polycube segmentation.

43. A method according to claim 42 wherein extracting the multi-sweep representation of the input object comprises:
  determining a desired polycube geometry based at least in part on the updated polycube segmentation and the input object; and
  iteratively deforming the input object toward the desired polycube geometry while computationally optimizing, by the processor, a cost function which balances obtaining the desired polycube geometry and providing low distortion deformations in each iteration.

44. A method according to claim 43 wherein extracting the multi-sweep representation comprises, after one or more iterations of deforming the input object toward the desired polycube geometry, applying the updated polycube segmentation to the deformed input object and performing one or more relabelings of the surface faces of the deformed input object, without changing the chart-level topology of the deformed input object, the one or more relabelings taking place at one or more of: pairs of charts on the deformed input object that share boundaries; and triplets of charts on the deformed input object that share corners, and wherein the relabelings provide a further updated polycube segmentation which attempts to optimize the boundaries of the deformed object for further deformation into strict adherence with polycube geometry.

45. A method according to claim 42 wherein extracting the multi-sweep representation of the input object comprises:
  determining an initially desired multi-sweep geometry based at least in part on the updated polycube segmentation and the input object; and
  iteratively deforming the input object toward the initially desired multi-sweep geometry while computationally optimizing, by the processor, a cost function which balances obtaining the initially desired multi-sweep geometry and providing low distortion deformations in each iteration.

46. A method according to claim 45 wherein extracting the multi-sweep representation comprises, after one or more iterations of deforming the input object toward the initially desired mulit-sweep geometry, applying the updated polycube segmentation to the deformed input object and performing one or more relabelings of the surface faces of the deformed input object, without changing the chart-level topology of the deformed input object, the one or more relabelings taking place at one or more of: pairs of charts on the deformed input object that share boundaries; and triplets of charts on the deformed input object that share corners, and wherein the relabelings provide a further updated polycube segmentation which attempts to optimize the boundaries of the deformed object for further deformation into strict adherence with multi-sweep geometry.

47. A method according to claim 44 wherein extracting the multi-sweep representation comprises:
  determining a final desired multi-sweep geometry based at least in part on the further updated polycube segmentation and the deformed input object; and
  iteratively deforming the deformed input object toward the final desired multi-sweep geometry while computationally optimizing, by the processor, a cost function which balances obtaining the final desired multi-sweep geometry and providing low distortion deformations in each iteration.

48. A method according to claim 47 wherein extracting the multi-sweep representation comprises performing a final deformation of the deformed input object which forces the deformed input object to strictly conform to the final desired multi-sweep geometry.

49. A method according to claim 45 wherein extracting the multi-sweep representation comprises performing a final deformation of the deformed input object which forces the deformed input object to strictly conform to the initially desired multi-sweep geometry.

50. A method according to claim 1 comprising locating turning points in a segmentation or branch segmentation, wherein locating turning points comprises, for each boundary between a corresponding pair of charts:
  determining the axial orientation of the boundary based on the normal vectors of the corresponding pair of charts; and
  and, for each edge of each surface face that defines the boundary:
    computing a dot product of the direction of the edge with the axial orientation of the boundary; and
    determining a turning point to be at any vertex on the boundary where this dot product changes sign.

51. A method according to claim 1 comprising locating turning points in a segmentation or branch segmentation, wherein locating turning points comprises, for each boundary between a corresponding pair of charts:
  determining the axial orientation of the boundary based on the normal vectors of the corresponding pair of charts; and
  for each edge of each surface face that defines the boundary:
    performing a computational optimization that assigns one of two labels (+ or −) to the edge;
    determining a turning point to be any vertex on the boundary where this label changes sign.

52. A method according to claim 51 wherein performing the computational optimization comprises using a cost function comprising a unary term which depends on the particular edge in consideration and a binary term which depends on the relationship between the particular edge in consideration and one or more of its neighboring edges.

53. A method according to claim 52 wherein the unary term comprises a Gaussian fall-off function having an exponent which comprises a dot product of a direction of the particular edge in consideration and the axial direction of the boundary.

54. A method according to claim 52 wherein the binary term is zero when the particular triangle edge in consideration and a consecutive edges on the boundary have the same direction and is otherwise a Gaussian function having an exponent which comprises a dot product of orientation vectors of the particular edge in consideration and the consecutive edge on the boundary.

55. A method according to claim 52 wherein the binary term is zero when the particular triangle edge in consideration and a consecutive edges on the boundary have the same direction and is unity otherwise.

56. A system for generating a polycube segmentation of an input object, the system comprising a processor configured to perform the method of claim 1.

57. A computer program product comprising a non-transitory computer readable medium storing computer-readable instructions thereon, which, when executed by a suitably configured computer system, cause the computer system to perform the method of claim 1.

* * * * *